United States Patent

Kouchi et al.

[11] Patent Number: 5,541,394
[45] Date of Patent: Jul. 30, 1996

[54] DELIVERY SERVICE MANAGEMENT SYSTEM

[75] Inventors: Toshihito Kouchi, Tokyo; Naoshi Honma, Yokohama; Yoshiki Ogawa; Hiromasa Suzuki, both of Tokyo, all of Japan

[73] Assignee: Olympus Optical Co., Ltd., Tokyo, Japan

[21] Appl. No.: 446,427

[22] Filed: May 22, 1995

Related U.S. Application Data

[63] Continuation of Ser. No. 158,942, Nov. 29, 1993, abandoned.

[30] Foreign Application Priority Data

Nov. 30, 1992 [JP] Japan .................................. 4-319143
Nov. 15, 1993 [JP] Japan .................................. 5-285251

[51] Int. Cl.⁶ .................................................. G06F 15/20
[52] U.S. Cl. ................................... 235/375; 364/408
[58] Field of Search .............................. 235/375, 385, 235/384, 383; 364/401, 408, 470, 478

[56] References Cited

U.S. PATENT DOCUMENTS

| 5,038,283 | 8/1991 | Coneney | 235/384 |
| 5,063,507 | 11/1991 | Lindsey et al. | 364/408 |
| 5,138,140 | 8/1992 | Siemiatkowski et al. | 235/462 |
| 5,285,383 | 2/1994 | Lindsey et al. | 364/408 |
| 5,478,990 | 12/1995 | Montanari et al. | 235/375 |

FOREIGN PATENT DOCUMENTS

| 54-87751 | 6/1979 | Japan | 235/484 |
| 2-268383 | 11/1990 | Japan | 235/484 |

*Primary Examiner*—Donald T. Hajec
*Assistant Examiner*—Thien Minh Le
*Attorney, Agent, or Firm*—Frishauf, Holtz, Goodman, Langer & Chick

[57] ABSTRACT

A delivery service management system utilizes a two-dimensional bar code having key information for specifying the source of a material and content information of this material and attached in a delivery service, a two-dimensional bar code having key information for specifying the source of an item obtained by processing the material and content information of the item and attached in a delivery service, and a two-dimensional bar code having key information for specifying a seller of the item and content information describing a selling condition of the item and attached in a delivery service. Every time a delivery service has occurred between the material system, the processing system, and the selling system, the key information and the content information are received from the two-dimensional bar code to a database. Delivery service information associated with a given source is fed back to the given source represented by the key information from a set of pieces of received information.

21 Claims, 15 Drawing Sheets

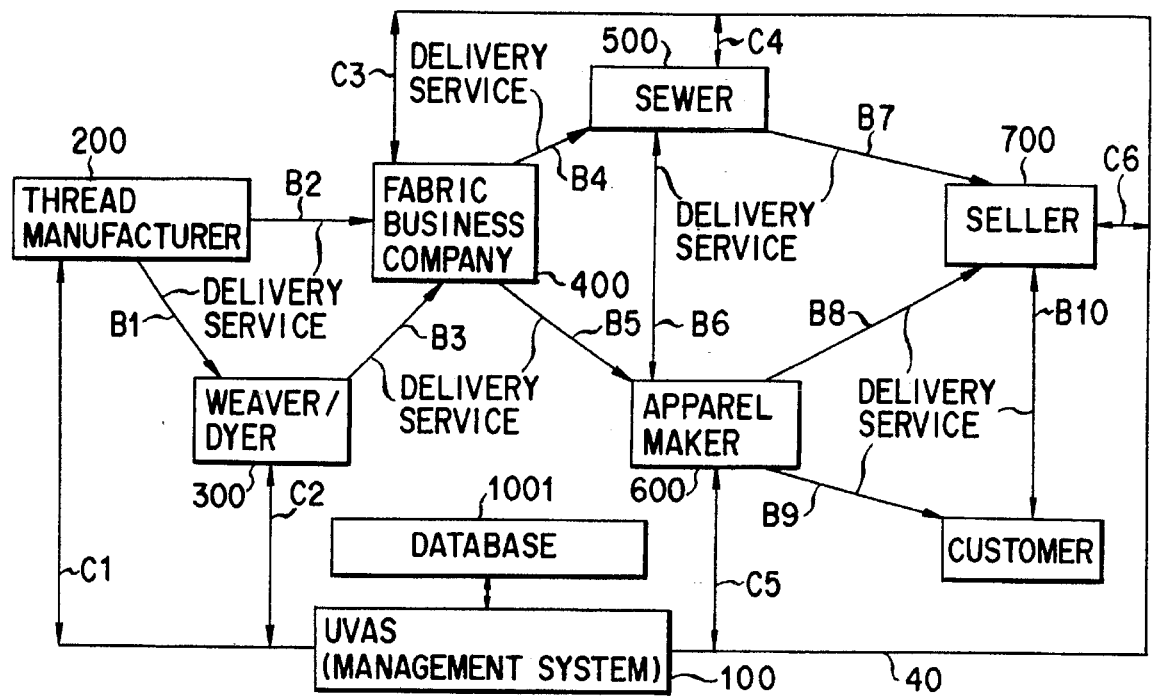
F I G. 1
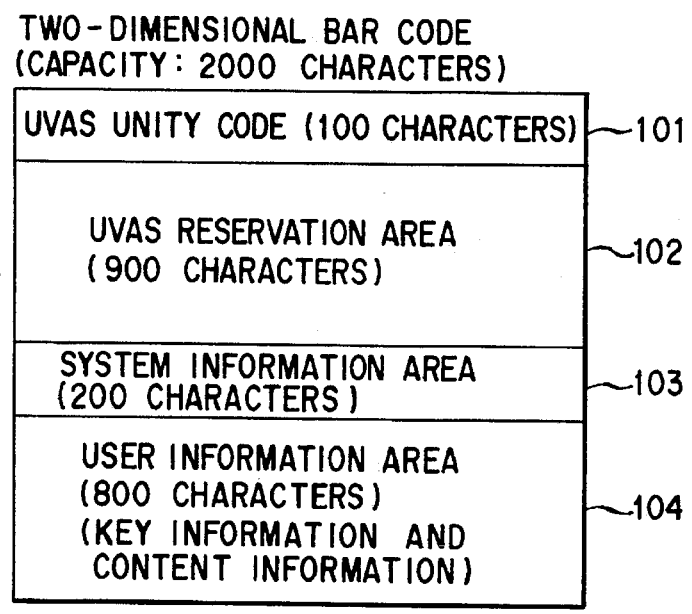
F I G. 2

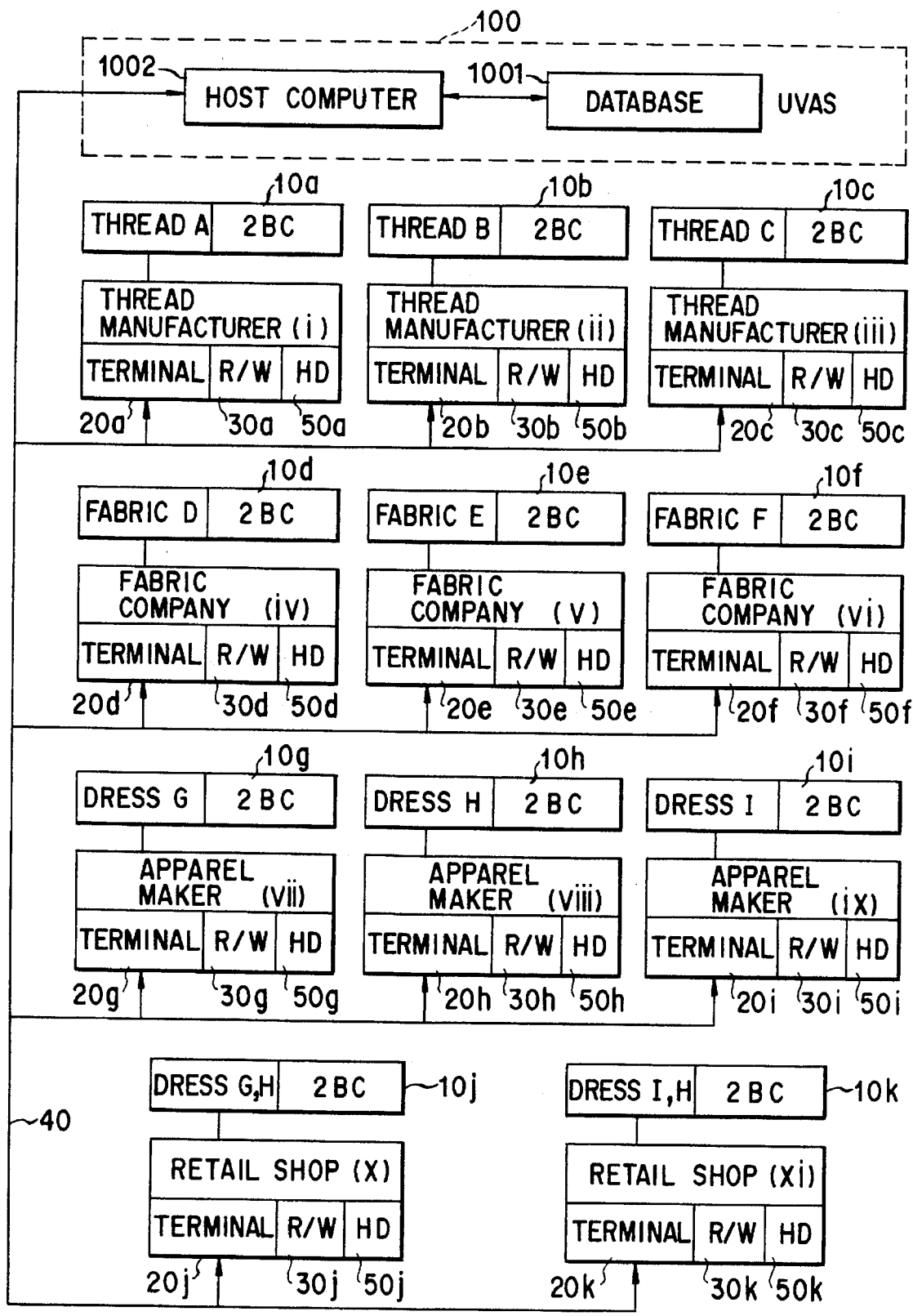
F I G. 4

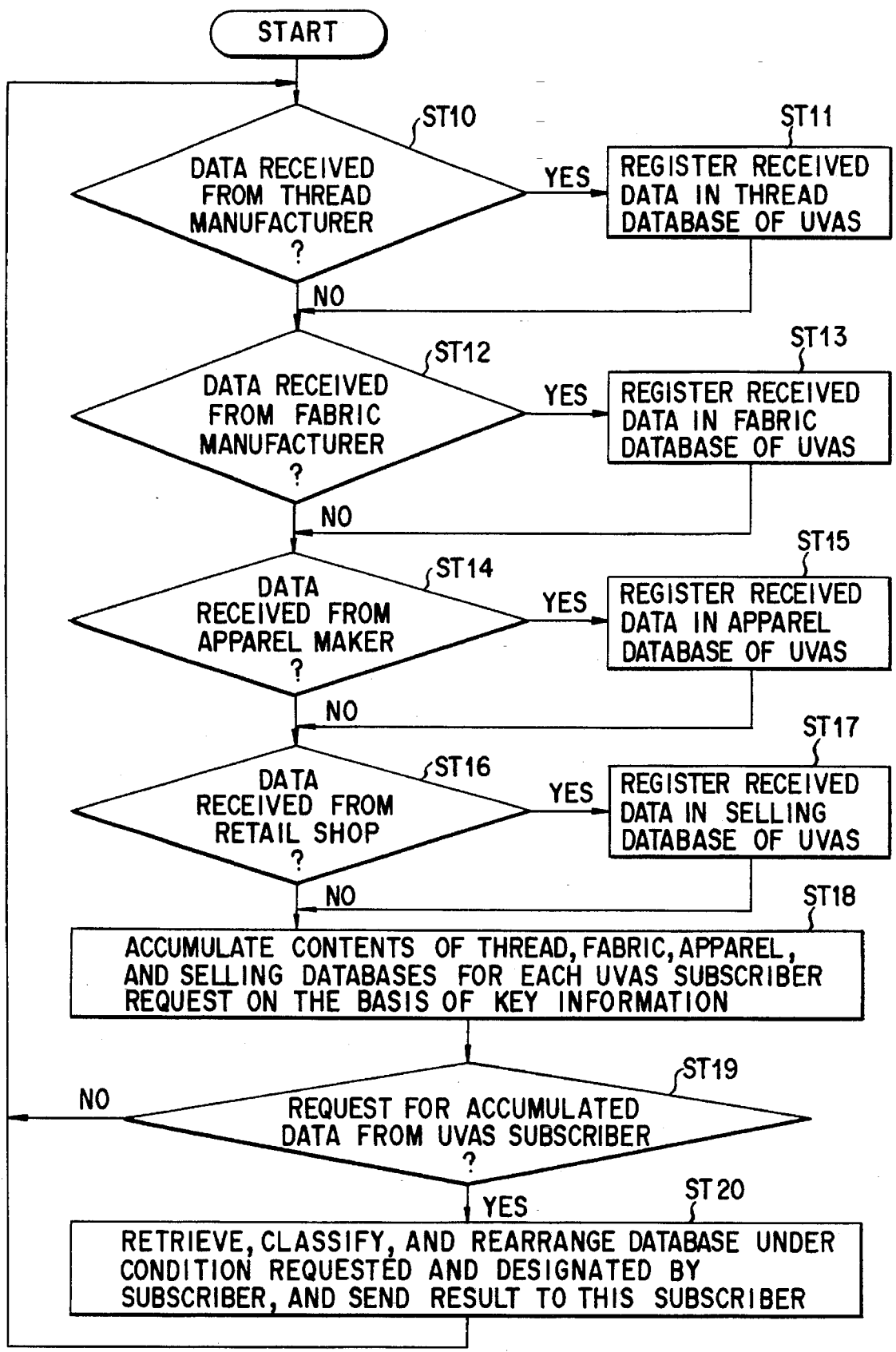
F I G. 5

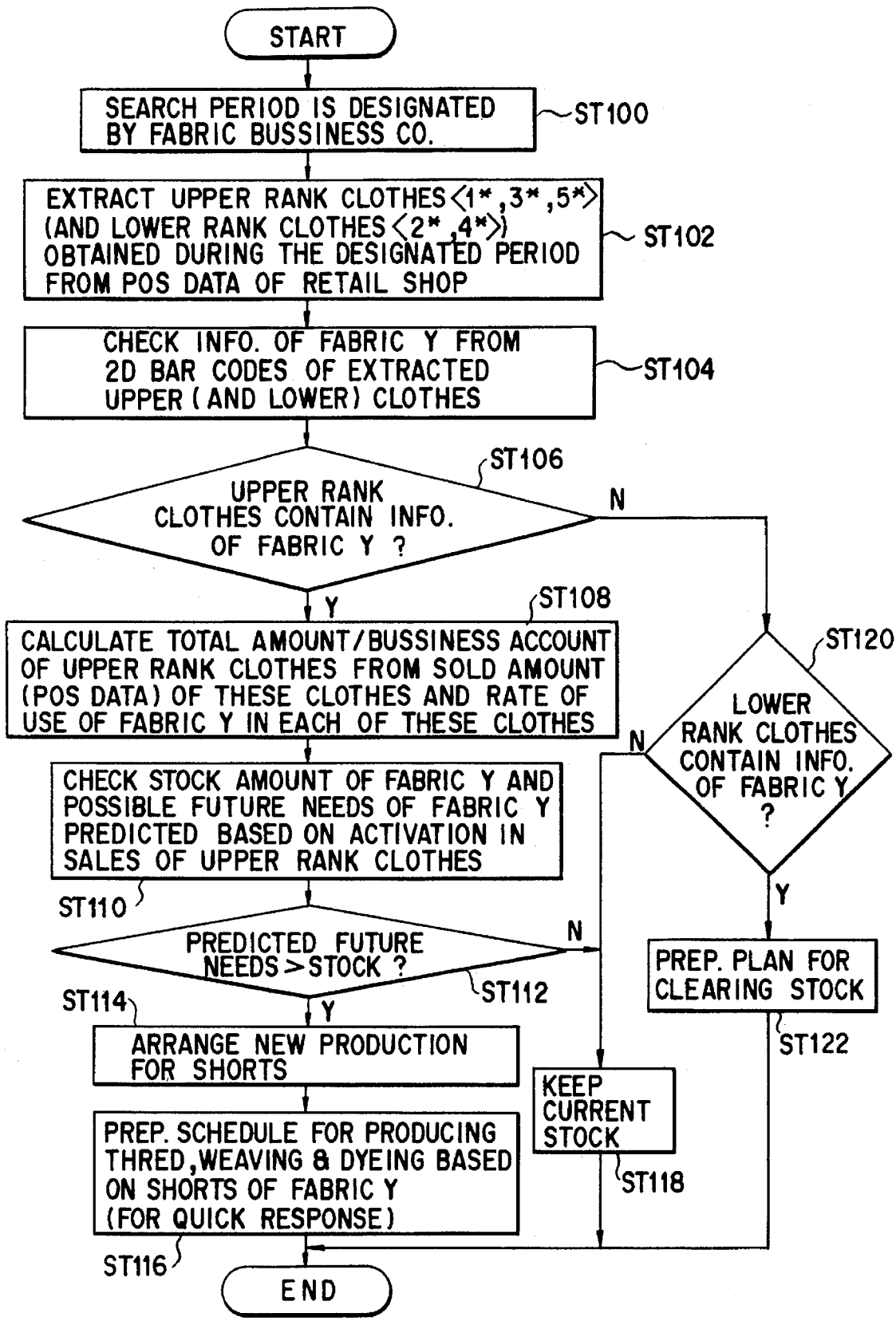
F I G. 6

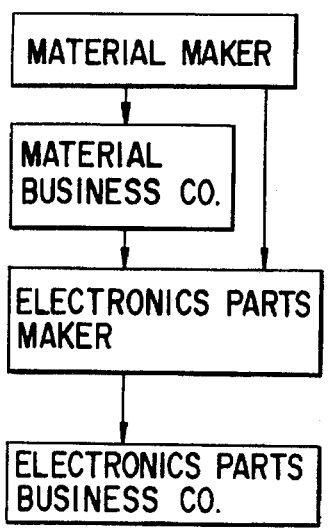
F I G. 7
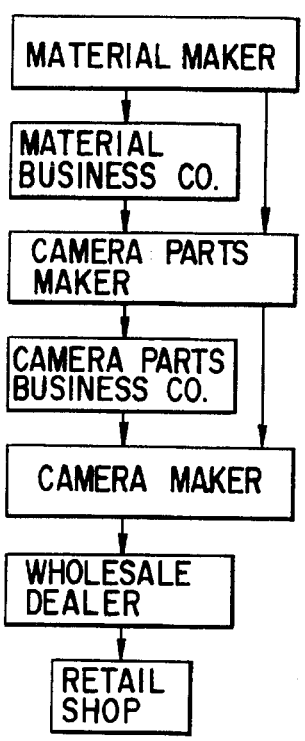
F I G. 8
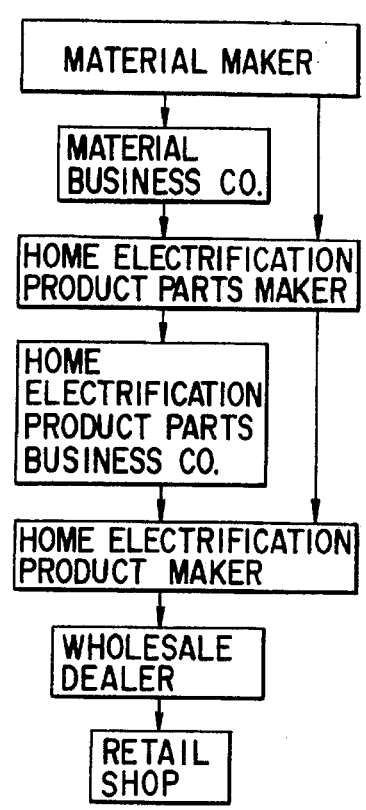
F I G. 9
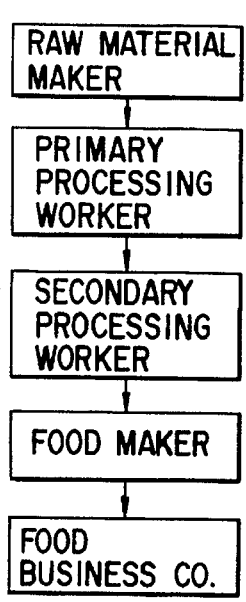
F I G. 10
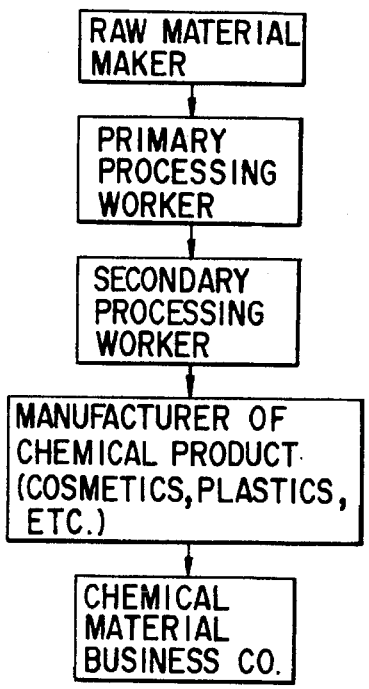
F I G. 11
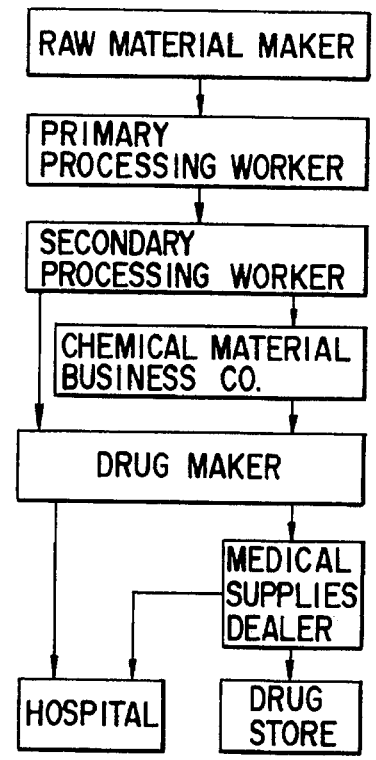
F I G. 12

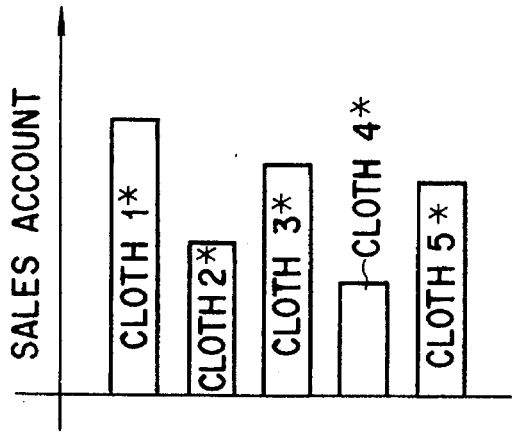
FIG. 26 SALES DATA OF CLOTHES USING FABRIC Y IN APPAREL BUSINESS WORLD
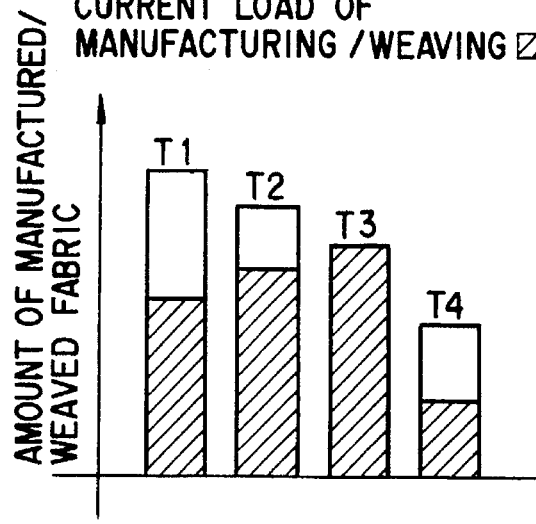
FIG. 27 CAPACITY OF THREAD MANUFACTURER/WEAVER ☐ & CURRENT LOAD OF MANUFACTURING/WEAVING ▨
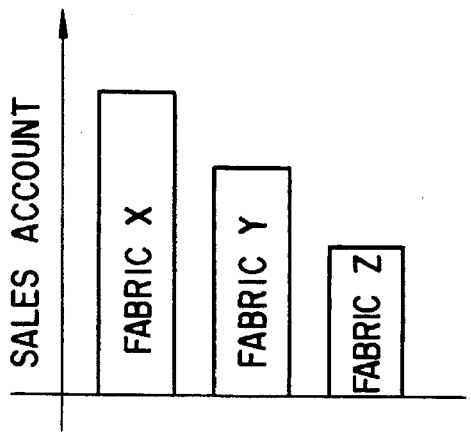
FIG. 28 SALES DATA OF FABRIC OF SPECIFIC BUSINESS CO.
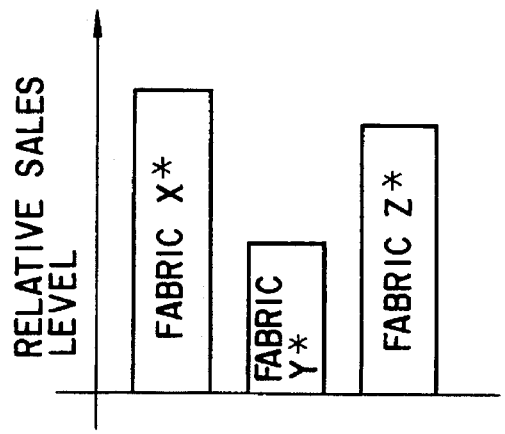
FIG. 29 RELATIVE SALES DATA OF SIMILER FABRICS IN FABRIC BUSINESS WORLD

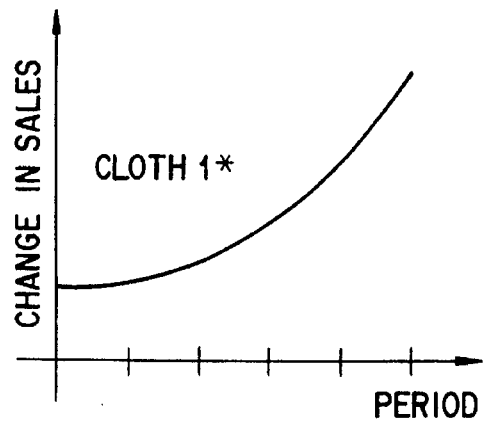
F I G. 30
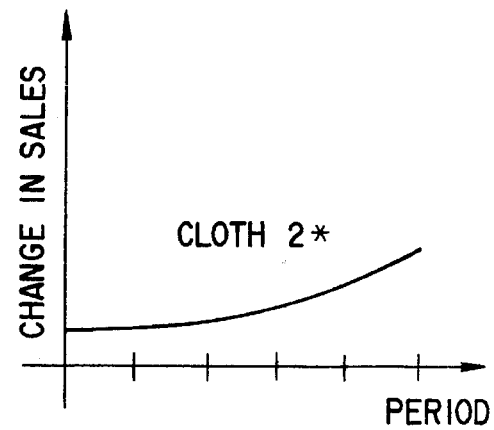
F I G. 31
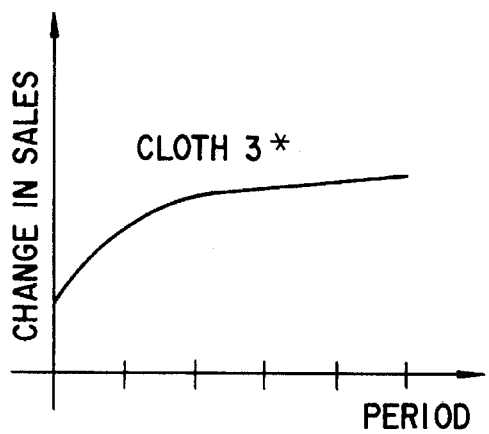
F I G. 32
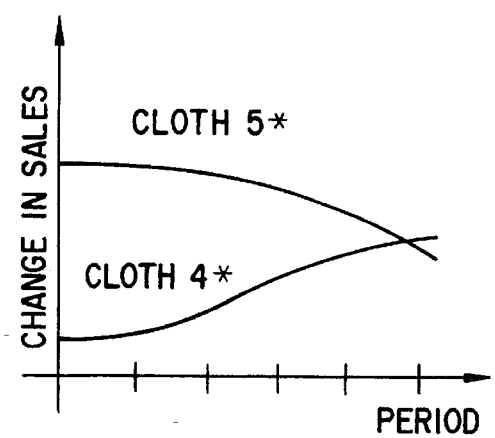
F I G. 33

DELIVERY SERVICE MANAGEMENT SYSTEM

This application is a continuation, of application Ser. No. 08/158,942, filed Nov. 29, 1993, now abandoned.

BACKGROUND OF THE INVENTION

1. Field of the Invention

The present invention relates to a delivery service management system for integrally managing all delivery services ranging from trading of raw materials to sale of goods and, more particularly, to a delivery service management system which can attach large-capacity information holding media such as two-dimensional bar codes (or two-dimensional data codes) to the goods, acquire information from such a medium in each delivery service, and feed back delivery service data to relating business fellows.

2. Description of the Related Art

A one-dimensional bar code (a code constituted by a large number of aligned bars having different widths, e.g., a code disclosed in Jpn. UM Appln. KOKAI Publication No. 54-87751) has been popular as a means for quickly and easily inputting each goods data to an information processing system. An information volume in a limited area is not so large because the one-dimensional bar code can represent information in only one direction to align the plurality of bars.

A two-dimensional bar code (a code having a two-dimensional code pattern corresponding to storage information in a predetermined surface, e.g., a code disclosed in Jpn. UM Appln. KOKAI Publication No. 2-268383) is proposed as a means for greatly increasing the information volume of the one-dimensional bar code. A way of satisfactorily utilizing the large information volume of the two-dimensional bar code, however, depends on a future development.

In a conventional sales management system (POS system) utilizing one-dimensional bar codes, only delivery service information representing the quantity of specific goods sold is acquired, because the information volume of the one-dimensional bar code is small. For example, a supermarket which mainly involves with retail operations can obtain sufficiently beneficial data by the conventional POS system utilizing one-dimensional bar codes. It is, however, difficult to cope with information acquisition of all the delivery services including the trading of raw materials for goods in any conventional POS system. In particular, a delivery service management system capable of feeding back desired delivery service data to individual relating business fellows from a set of pieces of information involving in delivery services of various kinds of goods in large quantities by a large number of business fellows cannot be anticipated from the extension of conventional POS systems.

For example, assume the following simple conditions for delivery services in the apparel business world. Three thread manufacturers (material system) (i), (ii), and (iii) individually manufacture and sell three different threads A, B, and C, respectively. Fabric company (material system) (iv) manufactures and sells fabric D using threads A and B. Fabric company (material system) (v) manufactures and sells fabric E using threads B and C. Fabric company (material system) (vi) manufactures and sells fabric F using threads A and C. Apparel maker (processing system) (vii) sews and sells dress G using fabrics E and F. Apparel maker (processing system) (viii) sews and sells dress H using fabrics D and F. Apparel maker (processing system) (ix) sews and sells dress I using fabrics D and E. Retail shop (selling system) (x) sells dresses G and H, and retail shop (selling system (xi) sells dresses H and I.

Under the above conditions, when retail shops (x) and (xi) engage in selling and management using a conventional POS system, they can know the sales amounts of specific dresses manufactured by specific apparel makers in accordance with POS data read from the bar codes of the goods (dresses G, H, and I). However, this POS data (i.e., selling data of a given dress as a final product item) cannot represent the sales amounts of threads of specific thread manufacturers or the sales amount of specific fabrics of specific fabric companies due to the lack of information.

SUMMARY OF THE INVENTION

It is an object of the present invention to provide a delivery service management system capable of feeding back desired delivery service data to each relating business fellow from a set of pieces of information involving in delivery services of various kinds of goods in large quantities between various kinds of business fellows.

A delivery service management system according to the present invention utilizes, for each delivery service data acquisition, at least one of a first information holding medium including key information for specifying a source of a material and content information describing contents of the material, as needed, the first information holding medium being attached to the material in a delivery service from a material system to a processing or selling system; a second information holding medium including key information for specifying a source of an item obtained by processing the material and content information describing contents of the item, as needed, the second information holding medium being attached to the item in a delivery service from the processing system to the selling system; and a third information holding medium including key information for specifying a selling location of the item and content information describing a selling condition of the item, as needed, the third information holding medium being attached to the item in a delivery service in the selling system.

In delivery services between the material, processing, and selling systems, key information and content information which are held by the first, second, or third information holding medium are received. When a database is created from a set of pieces of information obtained from each information holding medium in each delivery service, delivery service information associated with each source of a desired item can be fed back to this source using the key information.

Further, a two-dimensional data code (or two-dimensional bar code), which includes key information indicating the source of goods (e.g., thread A) and, as occasion demands, content information describing the contents of the goods, is attached to each goods during the delivery service among various business fellows (e.g., from thread manufacturers to retail shops).

In the system of the present invention, each time the delivery service of the goods occurs among these business fellows, the information (key information and content information) held by the two-dimensional data code (or two-dimensional bar code) is gathered. A group of the gathered information is arranged and divided into information pieces (including, e.g., fabric/cloth information using thread A) each containing a common element (thread A commonly used for various dress/clothes). Then, a particular portion (e.g., information of a specific fabric using thread A) of the divided information pieces can be fed back to the source (manufacturer of thread A) of the common element.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram for explaining delivery services when a delivery service management system according to an embodiment of the present invention is applied to an apparel business world;

FIG. 2 is a view showing the format of a two-dimensional bar code attached to a delivery service item in the delivery services in FIG. 1;

FIG. 4 is a block diagram for explaining a delivery service management system according to another embodiment of the present invention;

FIG. 5 is a flow chart for explaining information processing performed by a delivery service management system which is applied to the apparel business world;

FIG. 6 is a flow chart for explaining the arrangement of a fabric (upstream goods) from the activation of sales of good sellers (downstream goods) in an information process executed by a delivery service management system of the present invention which is applied to an apparel business world;

FIG. 7 is a block diagram for explaining a delivery service when the delivery service management system according to the embodiment shown in FIG. 1 is applied to an electronics parts business world;

FIG. 8 is a block diagram for explaining a delivery service when the delivery service management system according to the embodiment shown in FIG. 1 is applied to a camera business world;

FIG. 9 is a block diagram for explaining a delivery service when the delivery service management system according to the embodiment shown in FIG. 1 is applied to a home electrification product business world;

FIG. 10 is a block diagram for explaining a delivery service when the delivery service management system according to the embodiment shown in FIG. 1 is applied to a food processing business world;

FIG. 11 is a block diagram for explaining a delivery service when the delivery service management system according to the embodiment shown in FIG. 1 is applied to a chemical product business world;

FIG. 12 is a block diagram for explaining a delivery service when the delivery service management system according to the embodiment shown in FIG. 1 is applied to a drug business world;

FIG. 26 is a graph showing the sales amounts of clothes (downstream goods) in the apparel business world in terms of the sales amounts of specific fabrics (downstream goods)

Figure 3A:
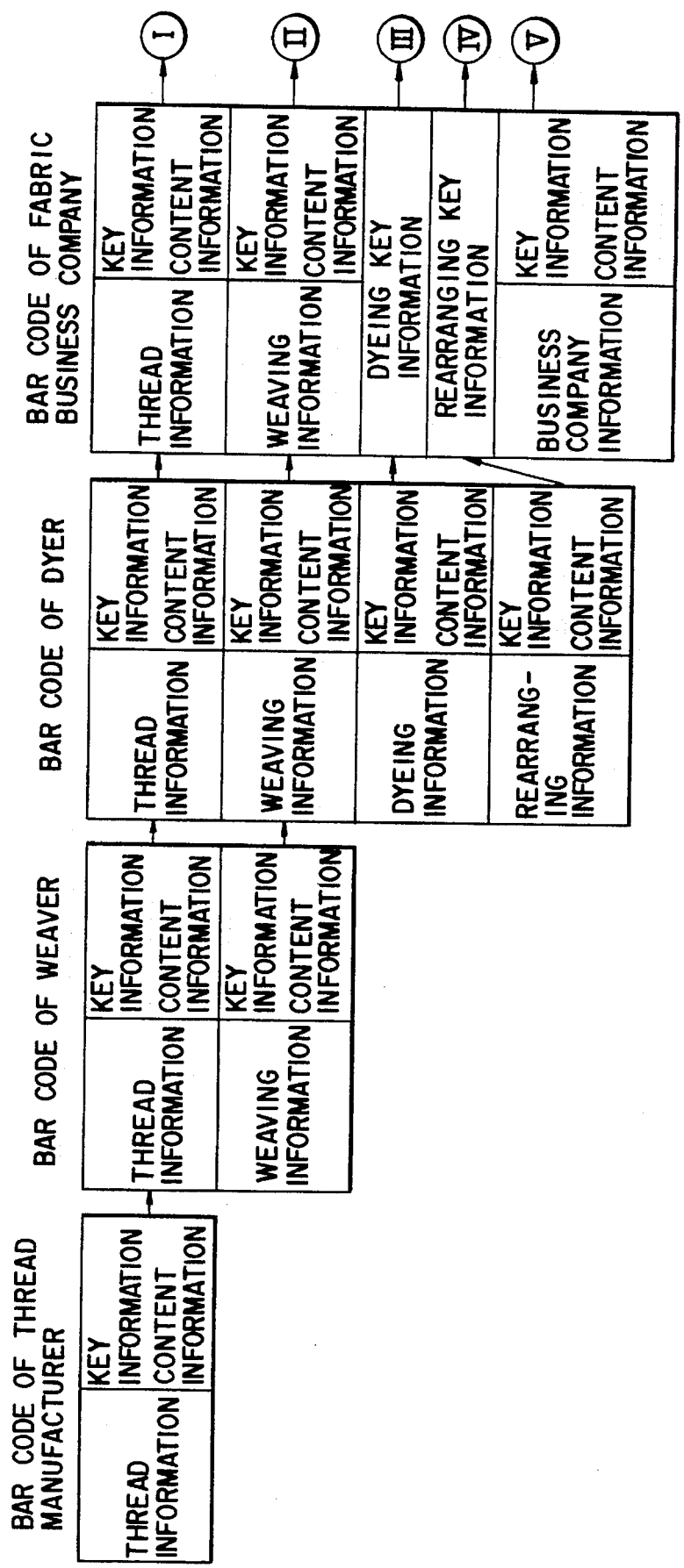
FIGS. 3A and 3B show views illustrating changes (accumulation changes in information in accordance with delivery services) in contents of the two-dimensional bar code attached to an item in accordance with delivery services in the apparel business world in FIG. 1.

used in these clothes, which graph represents an information service which can be performed by the delivery service management system of the present invention;

FIG. 27 is a graph showing real-time load conditions of a plurality of thread manufacturers/weavers having business transactions with a specific fabric business company, which graph represents an information service which can be performed by the delivery service management system of the present invention;

FIG. 28 is a graph showing the sales amounts of goods (fabrics) of a specific fabric business company, which graph represents an information service which can be performed by the delivery service management system of the present invention;

FIG. 29 is a graph showing the sales amounts of goods (fabrics) in the business world constituted by a plurality of fabric business companies, which graph represents an information service which can be performed by the delivery service management system of the present invention;

FIG. 30 is a graph showing time changes in the sales amount of cloth 1* in FIG. 26 in the apparel business world, which graph represents an information service which can be performed by the delivery service management system of the present invention;

FIG. 31 is a graph showing time changes in the sales amount of cloth 2* in FIG. 26 in the apparel business world, which graph represents an information service which can be performed by the delivery service management system of the present invention;

FIG. 32 is a graph showing time changes in the sales amount of cloth 3* in FIG. 26 in the apparel business world, which graph represents an information service which can be performed by the delivery service management system of the present invention; and FIG. 33 is a graph showing time changes in the sales amounts of clothes 4* and 5* in FIG. 26 in the apparel business world, which graph represents an information service which can be performed by the delivery service management system of the present invention.

DETAILED DESCRIPTION OF THE PREFERRED EMBODIMENTS

Preferred embodiments of the present invention will be described with reference to the accompanying drawings. Assume a delivery service management system for an apparel business world. This system is managed by a host computer having a delivery service management database. These database and host computer are operated by, e.g., a universal value-added system company (to be referred to as a UVAS hereinafter). Various kinds of business fellows who engage in the apparel business world are members of this UVAS. These business fellows use their own terminals to access the UVAS through a high-speed digital line.

FIG. 1 is a block diagram for explaining delivery services in the apparel business world. Thread manufacturer 200, weaver/dyer 300, fabric business company (or fabric/cloth company) 400, sewer 500, apparel maker 600, seller (retail shop) 700, all of which are members of the UVAS, appropriately access UVAS 100 having database 1001 through high-speed digital communication line 40.

Thread manufacturer 200 attaches its own two-dimensional bar code to its goods (threads) and ships the goods. Delivery service data C1 in this shipment is temporarily stored in its own memory (i.e., a local database utilizing a hard disk or the like), sent to UVAS 100 through line 40, and registered in database 1001. Delivery service data C1 representing the raw material (not shown) of the thread is also temporarily stored in its own memory, sent to UVAS 100 through line 40, and registered in database 1001.

An example of the two-dimensional bar code and its bar code reader are known and disclosed in, for example, U.S. Pat. No. 5,138,140 (Siemiatkowski et al.). The disclosure of this U.S. patent is incorporated with the present specification.

when the thread is shipped from thread manufacturer 200 to weaver/dyer 300, weaver/dyer 300 reads the two-dimensional bar code of the received thread. Thread delivery service B1 from thread manufacturer 200 to weaver/dyer 300 is temporarily stored in a memory (local database) of weaver/dyer 300. Data C2 of stored delivery service B1 is sent to UVAS 100 through line 40 and registered in database 1001.

Similarly, when thread manufacturer 200 ships its own thread to fabric business company (or fabric/cloth company) 400, delivery service data C1 in this shipment is sent to UVAS 100 through line 40 and registered in database 1001. Fabric business company 400 reads the two-dimensional bar code of the received thread. Delivery service B2 of the thread from thread manufacturer 200 to fabric business company 400 is temporarily stored in a memory (local database) of fabric business company 400. Data C3 of stored delivery service B2 is sent to UVAS 100 through line 40 and registered in database 1001.

Weaver/dyer 300 attaches its own two-dimensional bar code to its goods (nondyed or dyed fabric/cloth) and ships the goods. Delivery service data C2 in this shipment is sent to UVAS 100 through line 40 and registered in database 1001. When this fabric is shipped to fabric business company 400, fabric business company 400 reads the two-dimensional bar code of the received fabric. Delivery service B3 of the fabric from dyer 300 to fabric business company 400 is temporarily stored in a memory (local database), and data C3 of stored delivery service B3 is sent to UVAS 100 through line 40 and registered in database 1001.

Fabric business company (or fabric/cloth company) 400 attaches its own two-dimensional bar code to its goods (dry goods of the fabric) and ships its goods. Delivery service data C3 in this shipment is sent to UVAS 100 through line 40 and registered in database 1001. When this fabric is shipped to sewer 500, sewer 500 reads the two-dimensional bar code of the received fabric. Delivery service B4 of the fabric from fabric business company 400 to sewer 500 is temporarily stored in a memory (local database) of sewer 500, and data C4 of stored delivery service B4 is sent to UVAS 100 through line 40 and registered in database 1001.

Similarly, when fabric business company 400 ships its fabric to apparel maker 600, apparel maker 600 reads the two-dimensional bar code of the received fabric. Delivery service B5 of the fabric from fabric business company 400 to apparel maker 600 is temporarily stored in a memory (local database) of apparel maker 600. Data C5 of stored delivery service B5 is sent to UVAS 100 through line 40 and stored in database 1001.

In a request for a sewing order from apparel maker 600 to sewer 500, a predetermined fabric may be sent from apparel maker 600 to sewer 500. In this case, sewer 500 reads the two-dimensional bar code of the fabric received from apparel maker 600. Delivery service B6 of the fabric from apparel maker 600 to sewer 500 is temporarily stored in a memory of sewer 500. Data C4 of stored delivery service B6 is sent to UVAS 100 through line 40 and registered in database 1001.

When sewer 500 ships a sewed dress to apparel maker 600, delivery service data C4 in this shipment is sent to UVAS 100 through line 40 and registered in database 1001. Apparel maker 600 reads the two-dimensional bar code of the received fabric. Delivery service B6 of the dress from sewer 500 to apparel maker 600 is temporarily stored in a memory of apparel maker 600. Data C5 of stored delivery service B6 is sent to UVAS 100 through line 40 and registered in database 1001.

Sewer 500 may directly ship a sewed dress to seller 700, but not to apparel maker 600. Delivery service data C4 in this shipment is sent to UVAS 100 through line 40 and registered in database 1001. In this case, seller 700 reads the two-dimensional bar code of the received dress. Delivery service B7 of the dress from sewer 500 to seller 700 is temporarily stored in a memory (local database) of seller 700. Data C6 of stored delivery service B7 is sent to UVAS 100 through line 40 and registered in database 1001.

When apparel maker 600 ships the finished dress as a product item to seller 700, delivery service data C5 in this shipment is sent to UVAS 100 through line 40 and registered in database 1001. Seller 700 reads the two-dimensional bar code of the received dress. Delivery service B8 of the dress from apparel maker 600 to seller 700 is temporarily stored in the memory of seller 700. Data C6 of stored delivery service B8 is sent to UVAS 100 through line 40 and registered in database 1001.

When a received dress is sold, seller 700 reads the two-dimensional bar code of this dress, and delivery service B10 of this dress from seller 700 to a customer is temporarily stored in the memory of seller 700. Data (POS data) C6 of stored delivery service B10 is sent to UVAS 100 through line 40 and registered in database 1001.

Note that apparel maker 600 directly sells its own dresses to general consumers or customers. In this case, apparel maker 600 reads the two-dimensional bar code of the sold dress. Delivery service B9 from apparel maker 600 to a customer is temporarily stored in the memory of apparel maker 600. Data (POS data) C5 of stored delivery service B9 is sent to UVAS 100 through line 40 and registered in database 1001.

FIG. 2 shows the format of two-dimensional bar code 10 attached to an item delivered on the market in FIG. 1. This two-dimensional bar code has a memory capacity of 2,000 characters (each character is a two-byte coded character).

Two-dimensional code 10 has, e.g., 100-character UVAS unity code 101, 900-character UVAS reservation area 102, 200-character system information area 103, and 800-character UVAS user information area 104. This two-dimensional bar code 10 is printed on, e.g., a paper label with an adhesive.

A unity code used by UVAS 100 regardless of different users is additionally written in the area of unity code 101 in addition to user codes uniquely used by users (e.g., thread manufacturers, dyers, fabric business companies, sewers, apparel makers, and sellers).

Reservation area 102 is an area reserved to expand the UVAS system in the future and is kept blanked in the initial system operation period.

Data necessary for operating the current system is written in system information area 103. The data in area 103 can be used to determine whether the read two-dimensional bar code information is information used in the UVAS of the present invention or nonrelated information of a two-dimensional bar code used in an entirely different system.

The data in area 103 can also define processing of data after determining that the read two-dimensional bar code information is the information of the UVAS in the embodiment of the present invention. More specifically, data in area 103 can determine whether the contents of user information area 104 (to be described later) represent public or private data. The data in area 103 then defines a data processing method of protecting private information using a password. For example, if the information of delivery service B7 in FIG. 1 should be private to apparel maker 600, a password is used to prevent information of delivery service B7 from leaking to apparel maker 600 (an ID code assigned to each system subscriber by the UVAS may be used for the password. That is, using a system subscription ID code, UVAS 100 does not supply data of delivery service B7 to apparel maker 600 but to sewer 500 and seller 700).

User information area 104 is an area for allowing sewer 200, weaver/dyer 300, fabric business company (or fabric/cloth company) 400, sewer 500, apparel maker 600, or seller 700 to write information of an item in delivery service of this item. Data in user information area 104 is also used for a slip.

Figure 3B:
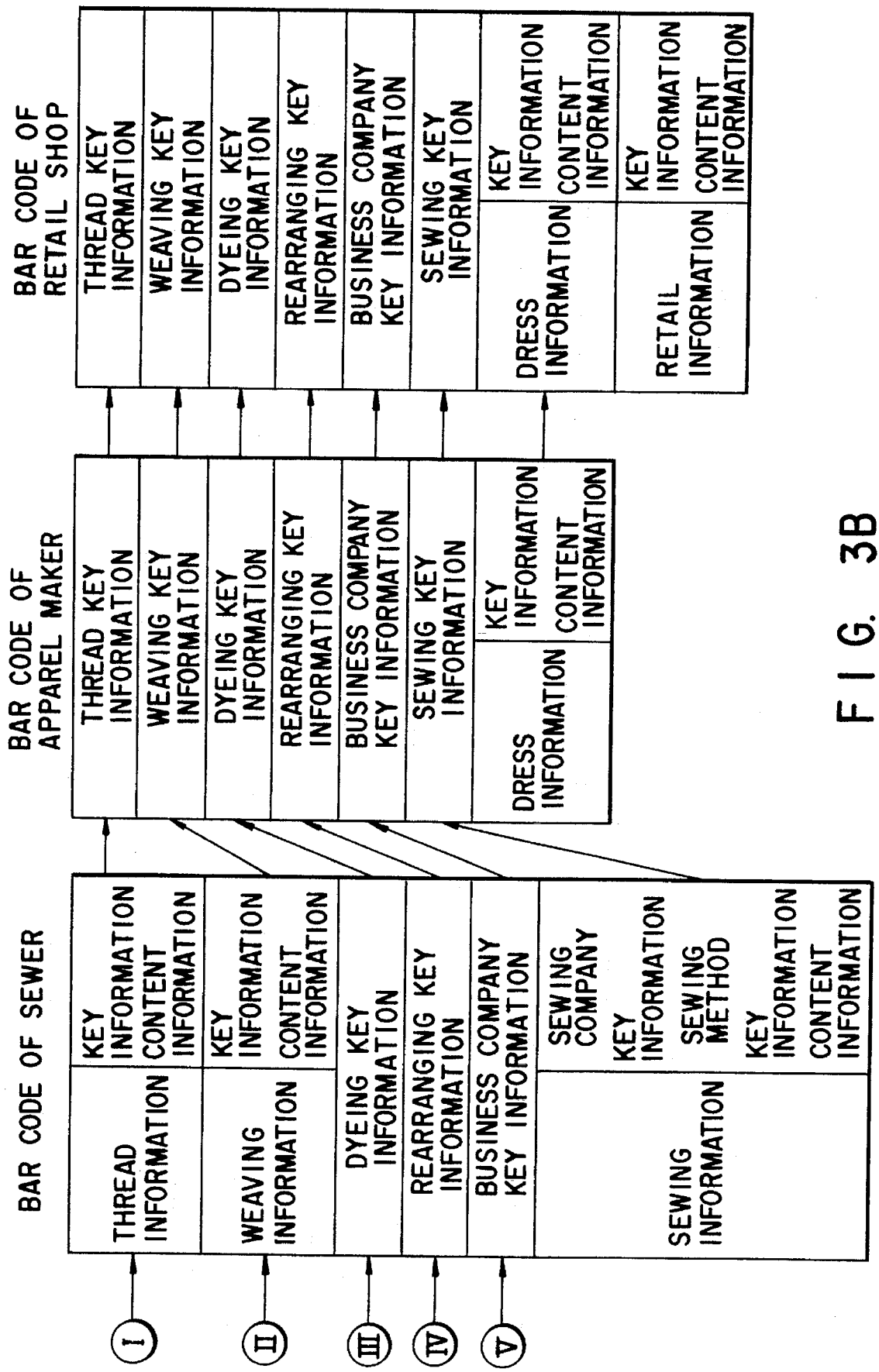

FIGS. 3A and 3B show changes in information of the two-dimensional bar code (FIG. 2) written in user information area 104 in accordance with delivery services.

For example, thread information formed of key information, including the manufacturing number and manufacturer code of a thread, and content information, including a thread material (e.g., silk or Nylon) and a thread twisting method, is written in user information area 104 of two-dimensional bar code 10 attached to the thread in delivery service B1 in FIG. 1. The two-dimensional bar code including this thread information is attached to a thread roll or its package. This thread is shipped to the weaver. The contents of the two-dimensional bar code are transferred to the UVAS.

The weaver weaves the supplied thread into a predetermined fabric (or cloth). Weaving information formed of key information, including the manufacturing number and manufacturer code of this fabric, and content information, including the fabric texture (i.e., a combination of weft and warp) and a weaving method, is written in user information area 104 of two-dimensional bar code 10 attached to the weaved fabric (the color of the fabric is the same as that of the thread). The two-dimensional bar code having the thread information and weaving information is attached to the fabric roll or its package. The fabric is then shipped to the dyer. The contents of this two-dimensional bar code are transferred to the UVAS.

The dyer dyes the supplied white fabric in a predetermined dye color. Dyeing information formed of key information, including the manufacturing number and manufacturer code of this fabric, and content information, including a fabric dyeing method (e.g., a kind of dye, a type of dyeing pot, and dyeing procedures), is written in user information area 104 of two-dimensional bar code 10 attached to the dyed fabric.

Rearranging information formed of key information, including fabric product codes obtained upon classifying/rearranging dyed fabrics having minute variations such as feelings or impressions, and content information, including the classification contents of the fabrics, is also added in user information area 104. The two-dimensional bar code including the thread information, the weaving information, the dyeing information, and the rearranging information is attached to this fabric as dry goods or its package. The fabric is shipped to fabric business company (or fabric/cloth company). The contents of the two-dimensional bar code are transferred to the UVAS.

Note that the weaver and the dyer are represented by weaver/dyer 300 in FIG. 1.

A two-dimensional bar code added with business company information is formed of key information including a code for specifying the business company and content information describing the contents of the fabric upon decision of the business company, and is attached by the fabric business company to the dyed fabric (dry goods) sent from the dyer. The fabric attached with this two-dimensional bar code is sent to the sewer when an order is made from the sewer. The contents of this two-dimensional bar code are transferred to the UVAS.

After the sewer sews the sent fabric into a predetermined dress, a two-dimensional bar code added with the sewing information, formed of key information including a code for specifying the sewer (sewing company), key information of the sewing method, and content information including the contents (e.g., an S-size one-piece dress) of the dress, is attached to the dress (or its package). The dress attached with this two-dimensional bar code is shipped to an apparel maker as a buyer. The contents of this two-dimensional bar code are transferred to the UVAS.

A two-dimensional bar code added with dress information formed of key information, including a code for specifying the apparel maker, and content information, including the contents (frilled S-size pink one-piece dress) upon decision by the apparel maker, is attached to the sent dress (or a tag attached to this dress). The dress attached with this two-dimensional bar code is shipped to the seller (retail shop) as a buyer. The contents of the two-dimensional bar code are transferred to the UVAS.

In this stage, all the content information of the thread, weaving, dyeing, rearranging, business company, and sewing is erased, and information can be simplified into only key information. If any piece of content information is required, the apparel maker can inquire the content information of the VAS in accordance with the key information and can know the contents of the key information.

A two-dimensional bar code added with retail information formed of key information, including a code for specifying a boutique, and content information, including contents (frilled S-size pink autumn one-piece dress for female workers in their twenties) describing a dress upon decision of the boutique, is attached to the sent dress (or a tag attached to the dress).

when a dress is sold to a customer, the two-dimensional bar code of this dress is read by a bar code reader, and its contents are transferred to the UVAS. The read data can be utilized for management (sales management) in this boutique as normal POS data.

When the data read by the boutique is transferred to the UVAS, data involving in goods delivery services (delivery services of threads, fabrics, and dresses) from the thread manufacturer to the customer are collected to the UVAS.

When each key information of the two-dimensional bar code data collected from the boutique is classified and analyzed, data which has never been obtained by any conventional POS system data can be obtained.

For example, when database 1001 of UVAS 100 is accessed using thread key information to retrieve data from a set of two-dimensional code data of various dresses individually sold in a large number of independent retail shops, an amount of a given thread of a given thread manufacturer which is used for a specific dress can be known. In addition, when database 1001 of UVAS 100 is accessed using business company key information, the amount of a specific fabric of a given fabric business company which is used for a specific dress can be known. If this dress (e.g., a swimming suit) is expected to be sold next year as well as this year, the fabric business company can order the corresponding thread, weaving, and dyeing beforehand so as to stock the dresses for a season in a boom.

A mark (e.g., a deformed mark of letters "UVAS") may be written in user information area 104 (even a complicated mark can be written when the storage capacity of a two-dimensional bar code is increased). If this mark is read from user information area 104 by a two-dimensional bar code reader and is displayed or printed together with any other information, this mark can be utilized as a service mark in delivery services.

FIG. 4 is a block diagram for explaining a delivery service management system according to another embodiment of the present invention.

For example, the delivery service management system in FIG. 4 is operated under the following condition. Two-dimensional bar codes (first information holding media) 10a, 10b, an 10c are marked on rolls of three different threads A, B, and C manufactured and sold by three thread manufacturers (material system) (i), (ii), and (iii), respectively. Each two-dimensional bar code medium can be a label (similar to a label for a 3.5" floppy disk) having the lower surface with an adhesive.

Key information (e.g., a product number and a manufacturer code) for specifying thread manufacturer (i) and content information (e.g., physical and chemical properties, the name of material such as silk or Nylon, and others) of thread A are represented by two-dimensional bar code 10a of thread A. Similarly, key information for specifying thread manufacturer (ii) and its content information are represented by two-dimensional bar code 10b of thread B, and key information for specifying thread manufacturer (iii) and its content information are represented by two-dimensional bar code 10c of thread C.

Two-dimensional bar codes (first information holding media) 10d, 10e, and 10f are marked on the rolls of fabrics D, E, and F independently manufactured and sold by fabric companies (material system) (iv), (v), and (vi), respectively. Key information (e.g., a product number and a company code) for specifying fabric company (iv) and content information (e.g., physical and chemical properties, a color, feelings, and others) of fabric D are represented by two-dimensional bar code 10d of fabric D in addition to the two-dimensional bar code information of threads A and B used for fabric D.

Similarly, key information for specifying fabric company (v) and content information of fabric E are represented by two-dimensional bar code 10e of fabric E in addition to the two-dimensional bar code information of threads B and C used for fabric E, and key information for specifying fabric company (vi) and content information of fabric F are represented by two-dimensional bar code 10f of fabric F in addition to the two-dimensional bar code information of threads A and C used for fabric F.

Two-dimensional codes (second information holding media) 10g, 10h, and 10i are attached to dresses G, H, and I sewed and sold by apparel makers (processing system) (vii), (viii), and (ix), respectively. Key information (e.g., an apparel code) for specifying apparel maker (vii) and content information (e.g., a color, a pattern, a customer group as a sales target, and others) are represented by two-dimensional bar code 10g of dress G in addition to the two-dimensional bar code information of fabrics E and F used for this dress G and threads A to C used for fabrics E and F.

Similarly, key information for specifying apparel maker (viii) and content information are represented by two-dimensional bar code 10h of dress H in addition to the two-dimensional bar code information of fabrics D and F used for this dress H and threads A to C used for fabrics D and F, and key information for specifying apparel maker (ix) and content information are represented by two-dimensional bar code 10i of dress I in addition to the two-dimensional bar code information of fabrics D and E used for this dress I and threads A to C used for fabrics D and E.

Two-dimensional bar codes (third information holding media) 10j and 10k of retail shops (x) and (xi) are attached to dresses G, H, and I sold by retail shops (x) and (xi). Although a two-dimensional bar code of the retail shop may be attached to any place of a dress, it can be attached to a label of the apparel maker of the dress.

Key information (e.g., a retail shop code) for specifying retail shop (x) and content information (e.g., POS data) of dresses G and H sold by retail shop (x) are represented by two-dimensional bar codes 10j of dresses G and H in addition to the two-dimensional bar code information of fabrics D to F used for the dresses, the two-dimensional bar code information of threads A to C used for these fabrics, and the two-dimensional bar code information of apparel makers (vii) and (viii) as the manufacturers of the dresses.

Similarly, key information for specifying retail shop (xi) and content information of dresses H and I sold by retail shop (xi) are represented by two-dimensional bar codes 10k of dresses H and I in addition to the two-dimensional bar code information of fabrics D to F used for the dresses, the two-dimensional bar code information of threads A to C used for these fabrics, and the two-dimensional bar code information of apparel makers (viii) and (ix) as the manufacturers of the dresses.

The thread manufacturers, the fabric companies, the apparel makers, and the retail shops have terminals 20a to 20k connectable to host computer 102 of UVAS 100 through digital line 40. Terminals 20a to 20k comprise two-dimensional bar code readers/writers 30a to 30k, respectively.

These two-dimensional bar code readers/writers scan two-dimensional bar codes to read their contents. These two-dimensional bar code readers/writers also have a function of converting predetermined data input at the terminal keyboards or the like into two-dimensional bar code patterns and writing the converted code patterns in two-dimensional bar code media (labels each having the lower surface with an adhesive).

When retail shop (x) sells dress G, two-dimensional bar code 10j of dress G is read by the scanner at retail shop (x). This read operation is performed for all the sold dresses. The read data (two-dimensional bar code data including POS data) are temporarily stored in memory or storage device 50j (e.g., a local database constituted by a hard disk or the like).

When retail shop (x) is closed at the closing time of each day, data stored in memory 50j are sent to UVAS 100 through line 40. Similarly, data (i.e., two-dimensional bar code data including POS data) at retail shop (xi) are also sent to UVAS 100 through line 40 from memory or storage device 50k after the closing time of each day.

FIG. 5 is a flow chart for explaining information processing of this delivery service management system for the apparel business world. When delivery service R1 or R2 in FIG. 1 has occurred, two-dimensional bar code data C1 is sent from the local database (hard disk) of the thread manufacturer to UVAS 100. When UVAS 100 receives this data (YES in ST10), data C1 is registered in the thread database in database 1001 of the UVAS (ST11).

When one of delivery services B2 to B5 has occurred, two-dimensional bar code data C3 is sent from the local database (hard disk) of the fabric business company to UVAS 100. When UVAS 100 receives this data (YES in ST12), data C3 is registered in the fabric database in database 1001 of the UVAS (ST13).

When delivery service B5, B6, B8, or B9 has occurred, two-dimensional bar code data C5 is sent from the local database (hard disk) of the apparel maker to UVAS 100. When UVAS 100 receives this data (YES in ST14), data C5 is registered in the apparel database in database 1001 of the UVAS (ST15).

When delivery service B7, B8, or B10 has occurred, two-dimensional bar code data C6 is sent from the local database (hard disk) of the seller (retail shop) to UVAS 100. When UVAS 100 receives this data (YES in ST16), data C6 is registered in the selling database in database 1001 of the UVAS (ST17).

Each retail shop can order dresses to the apparel maker through UVAS 100 using an electronic mail (a direct order may be made through a telephone/facsimile). For example, in FIG. 4, if retail shop (x) orders dresses G which are almost out of stock to apparel maker (vii) through an electronic mail, apparel maker (vii) delivers a predetermined number of dresses G, each having its own two-dimensional bar code 10g, by the due date. When the data of two-dimensional bar code 10g of dress G is sent from retail shop (x) to UVAS 100 (YES in ST16), host computer 102 knows the delivery service of dresses G in this delivery (ST17).

Similarly, when retail shop (xi) orders dress G to apparel maker (vii) and receives dress G from apparel maker (vii), the data of two-dimensional bar code 10g of dress G is sent from retail shop (xi) to UVAS 100. Host computer 102 knows the delivery service of dress G in this delivery.

When dresses G are almost out of stock, apparel maker (vii) orders fabrics E and F to make dresses G to fabric companies (v) and (vi).

If dresses H are a good seller and almost out of stock, apparel maker (viii) orders fabrics D and F for making dresses H to fabric companies (vi) and (v).

Fabric company (vi) attaches its own two-dimensional bar code 10f to fabric F and delivers it to apparel makers (vii) and (viii). Apparel maker (vii) reads two-dimensional bar code 10f of fabric F with its own scanner. Apparel maker (viii) also reads two-dimensional bar code 10f with its own scanner. The read two-dimensional bar code data are temporarily stored in storage devices (e.g., hard disks) 50g and 50h of apparel makers (vii) and (viii). At the end of office hours of apparel makers (vii) and (viii), the data stored in storage devices 50g and 50h are sent to UVAS 100 through line 40 (YES in ST14). Host computer 102 knows the delivery services of fabric F in these deliveries (ST15). When fabric F is almost out of stock, fabric company (vi) orders threads A and C for manufacturing fabric F to thread manufacturers (i) and (iii). When fabric D is almost out of stock, fabric company (iv) orders threads A and B for manufacturing fabric D to thread manufacturers (i) and (ii).

Thread manufacturer (i) attaches its own two-dimensional bar code 10a to thread A and delivers it to fabric companies (iv) and (vi). Fabric company (iv) reads two-dimensional bar code 10a of thread A with its own scanner. Fabric company (vi) also reads two-dimensional bar code 10a of thread A with its own scanner. The read two-dimensional bar code data are temporarily stored in storage devices 50d and 50f (e.g., hard disks) of fabric companies (iv) and (vi). At the end of office hours of fabric companies (iv) and (vi), the data stored in storage devices 50d and 50f are sent to UVAS 100 through line 40 (YES in ST12). Host computer 102 knows the delivery services of thread A in these deliveries (ST13).

By repeating the above operations, every time delivery services of threads, fabrics, and dresses have occurred between the thread manufacturers, the fabric companies, the apparel makers, and the retail shops, the two-dimensional bar code data of the threads, fabrics, and dresses are accumulated in data base 104 of UVAS 100 and are classified and rearranged (ST18).

The classified and rearranged information can be offered (ST20) appropriately (as a charged service), in response to a request (YES in ST19) from a UVAS subscriber. That is, the pieces of information collected from the UVAS subscribers to the UVAS are unified and rearranged. Some of the pieces (all, if required) of classified and rearranged information are properly fed back to the UVAS subscribers.

By this UVAS information offer (information feedback), for example, good sellers (or bad sellers) can be known from the two-dimensional bar code data from the retail shops. In addition, the sources (manufacturers) of fabrics and threads used for good (or bad) sellers and their amounts can also be known. For example, when an inquiry is made to UVAS 100, the amount and period of use of fabric D delivered by fabric company (vi) from April to June in 1992 and used for the good sellers can be known. Countermeasures for fabrics used for the bad sellers can be made, in advance, not to manufacture the fabrics any longer (not to stock them).

The system subscriber (e.g., a thread manufacturer) according to the present invention can know the current sales as a result of use of its own threads used for specific dresses in a given amount during a prescribed period. Similarly, a fabric company can know the current sales as a result of use of its own fabrics for specific dresses in a given amount during a prescribed period. When a fashion/demand trend of dresses as final products is grasped, demands for the amounts of threads and fabrics in a next season can be expected with a certain probability.

In the above description, a two-dimensional bar code is assumed as a medium for holding delivery service data. However, this medium may be an IC card or a magnetic card. The present invention is not limited to applications in the apparel business world, but can be extended to applications in other industries (e.g., the industry of electronic parts) accompanying delivery services.

FIG. 6 is a flow chart for explaining an information process executed by a delivery service management system of UVAS 100 shown in FIG. 1. Procedures and processes for fabrics (upstream goods) used in good sellers or bad sellers (downstream goods) in accordance with their activation in consumption will be described below.

Assume that a sales manager of fabric business company (fabric company) 400 accesses UVAS 100 to determine how to handle fabric Y as the goods of this fabric company. This sales manager inputs a search period (e.g., Apr. 1, 1992 to Mar. 31, 1993) at his own terminal 20d (FIG. 4) to check the activation in consumption of goods (clothes) using fabric Y (ST100).

Sales data (POS data) of various kinds of clothes sold in the past are stored from a large number of apparel makers 600 and a large number of retail shops (sellers) 700. A specific kind of fabric used for each cloth in a specific quantity can be known in accordance with a two-dimensional (2D) bar code.

For example, as shown in the item of the bar code of a given retail shop in FIGS. 3A and 3B, a cloth or dress sold in the given retail shop has the key information of a fabric business company (or fabric/cloth company) dealing with a fabric for this cloth/dress. When database 1001 is accessed on the basis of this key information of the fabric business company, all pieces of information contained in the bar code of the fabric of the fabric business company can be known. Therefore, the fabrics of all the clothes sold in the past can be known.

Host computer 1002 (FIG. 4) in UVAS 100 searches and extracts upper rank clothes (e.g., 1*, 3*, and 5* in FIG. 23) and lower rank clothes (e.g., 2* and 4* in FIG. 23) obtained during the designated period (Apr. 1, 1992 to Mar. 31, 1993) in the entire apparel business world from POS data registered in database 1001 (ST102).

The two-dimensional bar codes of the extracted upper rank clothes or good sellers (1*, 3*, and 5*) and the extracted lower rank clothes or bad sellers (2* and 4*) contain the key information of the fabric business companies. For this reason, when database 1001 is accessed on the basis of these pieces of key information of the fabric business companies, the fabrics used in the upper rank clothes (1*, 3*, and 5*) and the lower rank clothes (2* and 4*) can be known.

The sales manager checks at his or her own terminal 20d whether information of fabric Y of company 400 is included in registered information of the upper rank clothes (1*, 3*, and 5*) and the lower rank clothes (2* and 4*) (ST104).

For example, the total sales amount of clothes 1* and 3* can be known from their POS data. The amounts of specific fabrics used for specific portions of these clothes can be known from the sewing information/clothes (dress) information.

If information of fabric Y is included in the registered information using the two-dimensional bar codes of, e.g., upper rank clothes 1* and 3* (YES in ST106), the rate of use of fabric Y and the total business account (total sales amount) of fabric Y in upper rank clothes 1* and 3* can be calculated (ST108).

When the sales amount (or sold amount) of clothes 1* and 3* exhibits changes (activation in sales) shown in FIGS. 30 and 32 in accordance with the POS data of clothes 1* and 3* during the designated period, the possible future needs of fabric Y can be predicted from these objective data (including factors such as the experiences and hunches of the sales manager).

After the sales manager predicts the possible future needs of fabric Y, he or she accesses his or her own local database (e.g., HD 50d in FIG. 4) to check the stock amount of fabric Y (ST110).

If the possible future needs exceed the stock amount of this company (YES in ST112), there is a high possibility of the shorts of fabric Y in the near future. For this reason, the sales manager arranges new production to cover the predicted shorts (ST114).

When the sales manager decides the predicted new production amount and the predicted delivery of fabric Y, he or she prepares a schedule for producing threads, weaving, and dyeing to match the production amount and the delivery in accordance with the load conditions (FIG. 27) of a thread manufacturer, a weaver, and a dyer. Fabric Y is produced in accordance with this schedule (ST116).

As described above, when the future needs of fabric Y are predicted, and new production for the predicted shorts is arranged, fabric Y can be immediately delivered to meet an actual order from an apparel maker. That is, a quick response (QR) for the arrangement of fabrics can be made.

If the predicted needs are larger than the stock amount (NO in ST112), new production of fabric Y is not performed for the time being, and the current stock is kept (ST118).

On the other hand, if information of fabric Y is not included in the registered information using the two-dimensional bar codes of upper rank clothes 1* and 3* (NO in step ST106), but is included in the registered information using the two-dimensional bar codes of lower rank clothes (bad sellers) 2* and 4* (YES in ST120), the sales manager prepares a plan for clearing the stock by discounts or the like (ST 122).

If information of fabric Y is included in neither the registered information of upper rank clothes 1* and 3* nor the registered information of lower rank clothes 2* and 4* (NO in ST106 and ST120), the sales manager cannot decide the future needs. In this case, fabric Y is stocked as one of the products of the company, and the current stock is kept (ST118).

Figure 13:
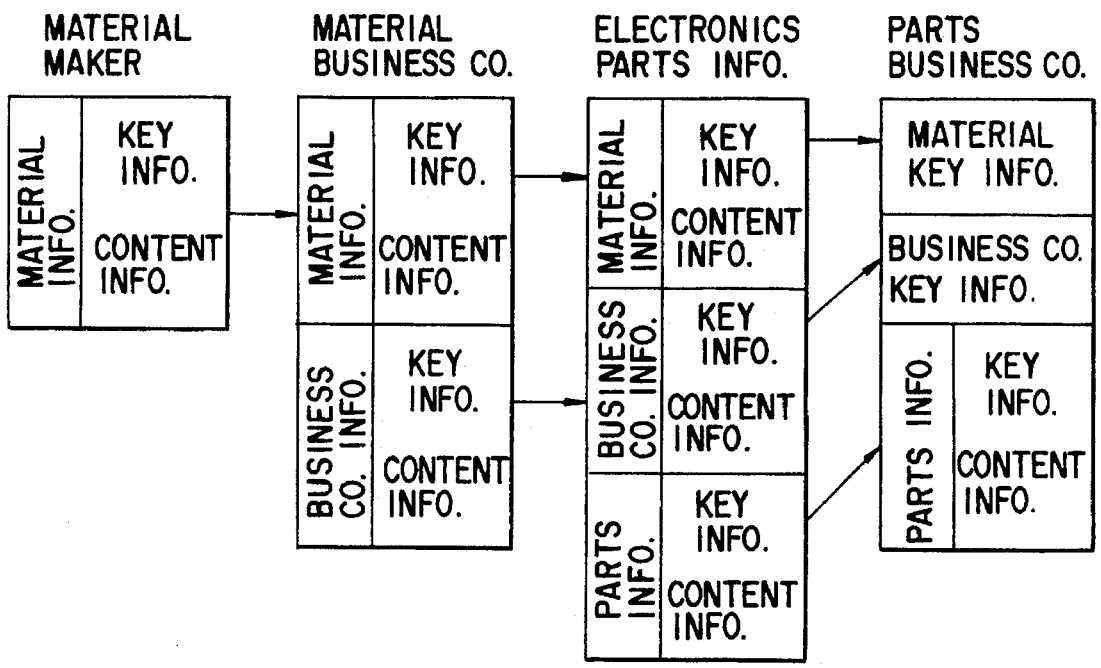
FIG. 13 is a view for explaining changes in contents of a two-dimensional bar code attached to a part (or its package) used in the electronics parts business world in FIG. 7 through delivery services.

FIG. 7 shows a delivery service when the delivery service management system according the embodiment shown in FIG. 1 is applied to an electronics parts business world. FIG. 13 shows changes (changes in accumulation of information involving with delivery services) in contents of two-dimensional bar codes attached to electronics parts (or their packages/packing materials).

Assume magnetic heads as electronics parts. Various magnetic bodies (e.g., ferrite and permalloy) for magnetic circuits and various wires for windings, which serve as raw materials, are delivered from at least one material maker to a material business company. Two-dimensional bar codes issued by the material makers are attached to the packing materials of the magnetic bodies for magnetic circuits and the wires for windings.

Each two-dimensional bar code contains material information of a material maker, as shown in FIG. 13. This two-dimensional bar code is read by the material business company at the time of reception. The read two-dimensional bar code information is sent to UVAS 100 through a communication line 40 in FIG. 1.

The material business company stocks various raw materials delivered from material companies to deliver the materials to electronics parts makers so as to meet individual orders. For example, the material business company delivers ferrite for magnetic circuits and a polyester-coated copper wire for windings which are ordered from an electronics parts maker. Two-dimensional bar codes issued by the material business company are attached to the packing materials of the ferrite for magnetic circuits and the polyester-coated copper wire for windings.

Each two-dimensional bar code contains material business company information in addition to the raw material information, as shown in FIG. 13. This two-dimensional bar code is read by the electronics parts maker at the time of reception. The read two-dimensional bar code information is sent to UVAS 100 through communication line 40.

An electronics parts maker may directly purchase ferrites for magnetic circuits and polyester-coated copper wires for windings from a plurality of material makers. In this case, the two-dimensional bar code issued by each magnetic material maker and attached to the packing material of the ferrite for magnetic circuits is read by the electronics parts maker at the time of reception. The two-dimensional bar code issued by the electric wire material maker and attached to the packing material of the polyester-coated copper wire for windings is read by the electronics parts maker at the time of reception. These pieces of read two-dimensional bar code information are sent to UVAS 100 through communication line 40. In this case, material company information is not sent to UVAS 100.

The electronics parts maker manufactures magnetic heads of its own technical specifications using the delivered ferrite for magnetic circuits, the delivered polyester-coated copper wire for windings, and the like and delivers the magnetic heads to a parts business company as a buyer for this electronics parts maker. A two-dimensional bar code issued by the electronics parts maker is attached to the packing material for each lot of magnetic heads.

As shown in FIG. 13, this two-dimensional bar code contains electronics parts maker information in addition to the raw material information and the material business company information. This two-dimensional bar code is read by the parts business company at the time of reception. The read two-dimensional bar code is sent to UVAS 100 through communication line 40.

This parts business company assembles, for example, cassette tape decks by attaching various mechanism parts/ electronics parts in addition to the magnetic heads, attaches its own two-dimensional bar codes to the packages of the finished tape decks, and sells the finished products. In this case, since the tape deck has a large number of constituent parts, only key information of the parts used in the tape deck is written in the two-dimensional bar code. If the key information is known, UVAS 100 can be accessed for the detailed contents of the constituent parts, thus posing no problem.

In the arrangements in FIGS. 7 and 13, for example, the amounts of ferrite for magnetic circuits sold by a given magnetic body material maker and used in cassette decks of parts business company A and video decks of parts business company B can be easily known.

FIG. 8 shows a delivery service when the delivery service management system according to the embodiment shown in FIG. 1 is applied to a camera business world.

Various materials (e.g., lens glass and metal/plastic materials for mechanism parts) constituting camera parts are delivered from at least one material maker to a material business company. Two-dimensional bar codes issued by the respective material makers are attached to the packing materials of these raw materials. The material business company reads the two-dimensional bar codes of the delivered raw materials and transfers the contents of the bar codes to UVAS 100 through communication line 40.

The material business company stocks various raw materials and delivers these raw materials to camera parts makers so as to meet individual orders. For example, the material business company delivers lens glass ordered by a camera parts maker. A two-dimensional bar code issued by the material business company is attached to the packing material of this glass.

The camera parts maker may directly order a material to a material maker, as needed. The camera parts maker also deals with auto-focus mechanisms and electronic circuit parts for EE mechanisms.

The camera parts maker attaches its own two-dimensional bar codes to glass-processed parts (e.g., lenses and prisms)

and the electronic circuit parts for EE mechanisms and delivers them to a camera parts business company. The camera parts business company reads the two-dimensional bar codes of the delivered camera parts and transfers the contents of these bar codes to UVAS 100 through line 40.

The camera parts business company stocks various camera parts and delivers camera parts to a camera maker so as to meet individual orders. For example, this camera parts business company delivers lenses ordered by a camera maker. A two-dimensional bar code issued by the camera parts business company is attached to the packing material of the lenses. Note the camera maker may directly order camera parts to a parts maker, as needed.

The camera maker reads the two-dimensional bar code of the delivered lenses and transfers the contents of the bar code to UVAS 100 through line 40.

The camera maker attaches its own two-dimensional bar code to the package of a camera manufactured by this camera maker and delivers the cameras to each wholesale dealer. The wholesale dealer reads the two-dimensional bar code of the stocked camera and transfers the contents of the bar code to UVAS 100 through line 40.

The wholesale dealer which stocks various types of cameras from various camera makers attaches its own two-dimensional bar codes to the cameras as its own goods and delivers the cameras to each retail shop. The retail shop reads the two-dimensional bar code of the delivered camera and transfers the contents of the bar code to UVAS 100 through line 40.

In the arrangement of FIG. 8, for example, amounts of glass sold by a given lens material maker used in upper rank still cameras of company A and upper rank video cameras of company B can be known. In addition, the amount of glass used in the entire video camera business world can also be known.

FIG. 9 shows a delivery service when the delivery service management system according to the embodiment shown in FIG. 1 is applied to the home electrification product business world. This application is similar to that in FIG. 8 if the camera parts are replaced with home electrification products.

Figure 14:
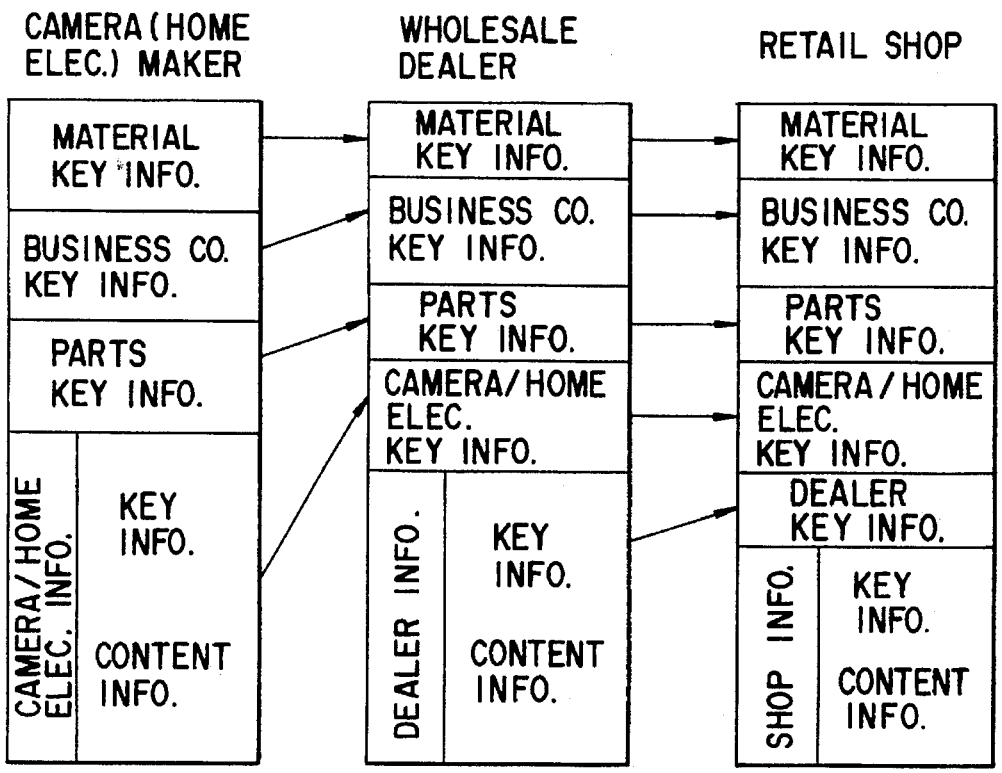
FIG. 14 is a view for explaining changes in contents of a two-dimensional bar code attached to a part (or its package) used in the camera business world in FIG. 8 (or the home electrification product business world in FIG. 9) through delivery services.

FIG. 14 shows changes (changes in accumulation of information involving with delivery services) in contents of two-dimensional bar codes attached to parts (or packages/packing materials) used in the camera business world in FIG. 8 or the home electrification product business world in FIG. 9 in accordance with delivery services.

For example, as shown at the left end of FIG. 14, a two-dimensional bar code containing key information of a material maker, key information of a material business company, key information of a parts business company, key information of a camera maker (or a home electrification product maker), and content information is attached to a camera (or a home electrification product such as a television set) delivered by the camera maker (or the home electrification product maker). The detailed content information associated with the material maker, the material business company, and the parts business company can be obtained by accessing database 1001 of UVAS 100 with reference to the corresponding pieces of key information.

As shown at the center of FIG. 14, a two-dimensional bar code containing the key information of the material maker, the key information of the material business company, the key information of the parts business company, the key information of the camera maker (or the hole electrification product maker), key information of a wholesale dealer, and content information is attached to a camera (or a television set) delivered by this wholesale dealer. The detailed content information associated with the material maker, the material business company, the parts business company, and the camera maker (or the home electrification product maker) can be obtained by accessing database 1001 of UVAS 100 with reference to the corresponding pieces of key information.

As shown at the right end of FIG. 14, a two-dimensional bar code containing the key information of the material maker, the key information of the material business company, the key information of the parts business company, the key information of the camera maker (or the home electrification product maker), the key information of the wholesale dealer, key information of a retail shop, and content information is attached to a camera (or a television set) sold by this retail shop. The detailed content information of the material maker, the material business company, the parts business company, the camera maker (or the home electrification product maker), and the wholesale dealer can be obtained by accessing database 1001 of UVAS 100 with reference to the corresponding pieces of key information.

FIG. 10 shows a delivery service when the delivery service management system according to the embodiment shown in FIG. 1 is applied to a food processing business world.

For example, when an import business company imports wheat from a foreign country and delivers it to a primary processing worker, a two-dimensional bar code containing key information of this import business company and content information (e.g., a country of origin/name of production area, a crop year, use/non-use of pesticides/insecticides) associated with the wheat is attached to a wheat storage bag.

The primary processing worker reads the two-dimensional bar code attached to the wheat storage bag and sends the read contents to UVAS 100 through communication line 40.

The primary processing worker checks the quality of wheat and the use/non-use of pesticides/insecticides from the content information written in the two-dimensional bar code and processes the wheat into flour in accordance with an appropriate processing method. A two-dimensional bar code containing the key information of the import business company, key information of the primary processing worker, and content information is attached to a flour storage bag. The bag is then delivered to a secondary processing worker.

The secondary processing worker reads the two-dimensional bar code attached to the flour storage bag and sends the read contents to UVAS 100 through line 40.

The secondary processing worker checks the quality of flour and the like in accordance with the content information written in the two-dimensional bar code and manufactures macaroni. A two-dimensional bar code containing the key information of the import business company, the key information of the primary processing worker, and key information of the secondary processing worker, and content information is attached to the resultant macaroni storage bag. The macaroni storage bags are then shipped to a food maker.

The food maker reads the two-dimensional bar code attached to each macaroni storage bag and sends the read contents to UVAS 100 through line 40.

The food maker checks the quality of macaroni and the like in accordance with the content information written in the two-dimensional bar code and manufactures, for example, macaroni au gratin packages for oven cooking in accordance with a cooking method suitable for this macaroni. A two-dimensional bar code containing the key information of the import business company, the key information of the primary processing worker, the key information of the secondary processing worker, key information of the food maker, and content information is attached to the package box of macaroni au gratin. The package boxes are then shipped to each food business company.

In the arrangement in FIG. 10, for example, macaroni au gratin sold by a given food maker (or a rapid-fire Chinese noodle of another food maker which is manufactured using the same wheat as that of the macaroni au gratin) is more tasty than equivalent products of other companies and is a best seller, the reason can be checked and examined up to information of the country of origin/production area, the crop year, and the like.

FIG. 11 shows a delivery service when the delivery service management system according to the embodiment shown in FIG. 1 is applied to a chemical product business world.

For example, when a given import business company imports crude oil from a foreign company and delivers it to a primary processing worker, a two-dimensional bar code containing key information of this import business company and content information (e.g., a country of origin/name of oil field, and quality) associated with the crude oil is attached to a crude oil storage container.

The primary processing worker reads the two-dimensional bar code attached to the crude oil storage container and sends the read contents to UVAS 100 through communication line 40.

The primary processing worker checks the quality of crude oil and the like in accordance with the content information written in the two-dimensional bar code and refines the crude oil into gasoline, gas oil, and heavy oil in accordance with the refining method suitable for this crude oil. A two-dimensional bar code containing the key information of the import business company, key information of the primary processing worker, and content information is attached to a heavy oil storage container or the like. The heavy oil storage container is shipped to a secondary processing worker.

The secondary processing worker reads the two-dimensional bar code attached to, e.g., the heavy oil storage container and sends the read contents to UVAS 100 through line 40.

The secondary processing worker checks the quality of heavy oil and the like in accordance with the content information written in the two-dimensional bar code and manufactures, e.g., a colored plastic (thermoplastic resin) material in accordance with a manufacturing method suitable for the components of this crude oil. A two-dimensional bar code containing the key information of the import business company, the key information of the primary processing worker, key information of the secondary processing worker, and content information is attached to the storage container which contains the resultant plastic material. The storage container is shipped to a manufacturer of chemical product.

The manufacturer of chemical product reads the two-dimensional bar code attached to the storage container which stores the plastic material and sends the read contents to UVAS 100 through line 40.

The manufacturer of chemical product checks the quality (e.g., physical properties) of the plastic in accordance with the content information written in the two-dimensional bar code and properly processes the plastic material to manufacture, e.g., molded parts for plastic models. A two-dimensional bar code containing the key information of the import business company, the key information of the primary processing worker, the key information of the secondary processing worker, key information of the manufacturer of chemical product, and content information is attached to a package box of the resultant molded parts. The package boxes are shipped to each chemical material business company.

In the arrangement of FIG. 11, for example, if it is found that a toxic gas is produced upon burning the plastic model using the plastic molded bodies manufactured by a given manufacturer of chemical product, its reason can be checked and examined up to the primary/secondary processing stage and then the stage of the raw material.

FIG. 12 shows a delivery service when the delivery service management system according to the embodiment in FIG. 1 is applied to a drug business world.

For example, when a given raw material business company stocks foreign and domestic medical plants and delivers them to a primary processing worker, a two-dimensional bar code containing key information of this raw material business company and content information (e.g., the name of a place of gathering, the time of gathering, a chemical component analysis result, and any other quality) associated with the medical plants is attached to each medical plant storage container.

The primary processing worker reads the two-dimensional bar code attached to the medical plant storage container and sends the read contents to UVAS 100 through communication line 40.

The primary processing worker checks the quality/components of the medical plant in accordance with the content information written in the two-dimensional bar code and extracts/purifies a specific medical component from the medical plant in accordance with a processing method suitable for this medical plant. A two-dimensional bar code containing the key information of the raw material business company, key information of the primary processing worker, and content information is attached to the storage container which contains the extracted/purified medical component. This storage container is shipped to the secondary processing worker.

The secondary processing worker reads the two-dimensional bar code attached to the medical component storage container and sends the read contents to UVAS 100 through line 40.

The secondary processing worker checks the quality of the medical component and the like in accordance with the content information written in the two-dimensional bar code and manufactures a sedative/antipyretic drug in accordance with a method suitable for this medical component. A two-dimensional bar code containing the key information of the raw material business company, the key information of the primary processing worker, key information of the secondary processing worker, and content information is attached to the storage container of the resultant sedative/antipyretic drug. The containers are shipped to each chemical material business company (or a drug maker).

The chemical material business company reads the two-dimensional bar code attached to the storage container of the sedative/antipyretic drug and sends the read contents to UVAS 100 through line 40.

The chemical material business company stocks various drugs from various processing workers. A two-dimensional bar code containing the key information of the raw material business company, the key information of the primary processing worker, the key information of the secondary processing worker, key information of the chemical material business company, and content information is attached to a package box of a drug, ordered by a buyer (drug maker), of all the stocked drugs. The ordered drug package boxes are shipped to the drug maker.

For example, the drug maker checks the quality (e.g., statements of components, properties, side effects of the drug) of the ordered drug in accordance with the content information written in the two-dimensional bar code, obtains the authority of the Ministry of Health and Welfare (or checks that the drug has already obtained its authority), and produces this product as an authorized medical product (sedative/antipyretic drug). A two-dimensional bar code containing the key information of the raw material business company, the key information of the primary processing worker, the key information of the secondary processing worker, the key information of the chemical material business company, key information of the drug maker, and content information is attached to the package of the drug product. The packages are then shipped to each medical supplies dealer (or a hospital).

The medical supplies dealer reads the two-dimensional bar code attached to the storage container of the drug product (sedative/antipyretic drug) and sends the read contents to UVAS 100 through line 40.

The medical supplies dealer checks the quality, properties, and side effects of the drug in accordance with the content information written in the two-dimensional bar code and classifies and arranges the contents. A two-dimensional bar code containing the key information of the raw material business company, the key information of the primary processing worker, the key information of the secondary processing worker, the key information of the chemical material business company, the key information of the drug maker, key information of the medical supplies dealer, and content information is attached to the package box of this classified and arranged medical product. The package boxes are shipped to each hospital or drug store.

In the arrangement of FIG. 12, if it is found that unexpected similar side effects of drugs independently manufactured by at least two drug makers are caused, the reason can be checked and examined up to the primary/secondary processing stage and then the stage of the raw material.

In the delivery services in FIGS. 10 to 12, the processing workers are the primary and secondary processing workers. However, only the primary processing worker may be used, and the number of types of processing workers may be three or more.

Figure 15:
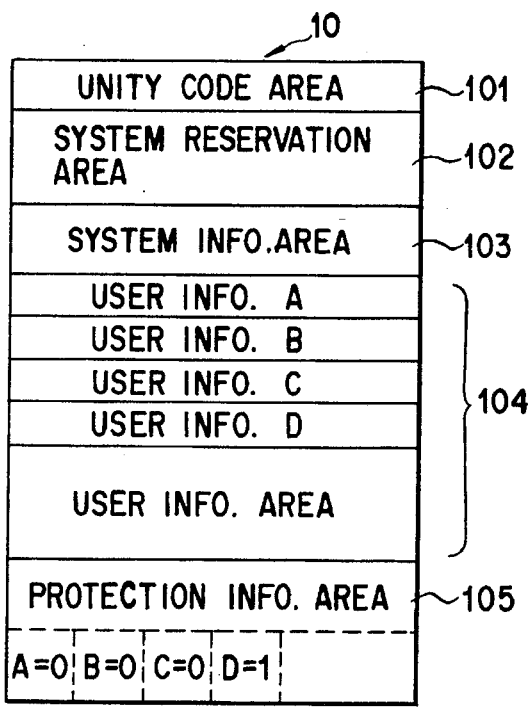
FIG. 15 is a view showing another format of the two-dimensional bar code used in the delivery services shown in FIGS. 1 and 7 to 12.

FIG. 15 is a modification of the two-dimensional bar code format shown in FIG. 2. This format is used in the deliver services in FIGS. 1 and 7 to 12. The format in FIG. 15 is obtained by adding protection information area 105 to the format in FIG. 2.

In the format of FIG. 15, user information A, user information B, and user information C are pieces of public information. However, user information D is private information. In this case, protection flags A=0, B=0, C=0, and D=1 are written in protection information area 105. If the protection flags are set at "0", the corresponding pieces of information (A to C) are not protected. However, if the protection flag is set at "1", the corresponding information (D) is protected. These protection flags are written using a two-dimensional bar code reader/writer (any of 30a to 30k in FIG. 4) at the issuance of a two-dimensional bar code.

Of all the information written in the two-dimensional bar code of the retail shop shown in FIG. 3, all pieces of key information such as thread key information, weaving key information, and dyeing key information are public information. For this reason, the protection flags of these pieces of information are set at "0". On the other hand, if content information of the clothes or dress and the content information of the retail shop require privacy, the protection flags of these pieces of content information are set at "1".

No problem is posed even if key information itself is known to a third party due to the following reason. Even if the third party wants to know UVAS registered information (content information) corresponding to this key information, the third party who is not qualified to access the registered information (qualification can be represented by an ID issued by UVAS 100) cannot access the content information corresponding to the key information from the UVAS 100.

Figure 16:
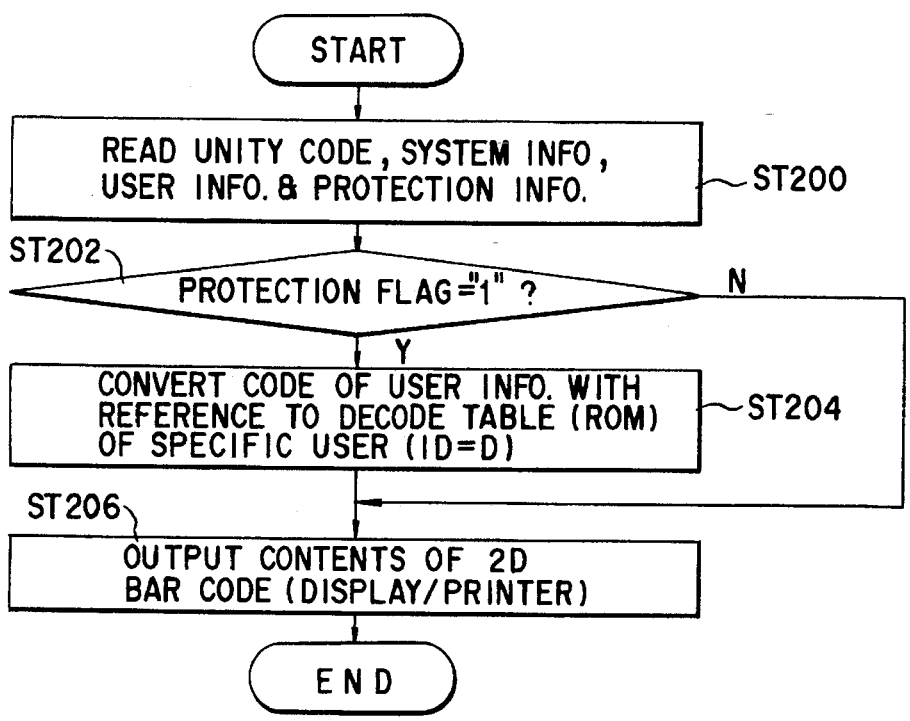
FIG. 16 is a flow chart for explaining a process of protection information read from the two-dimensional bar code having the format in FIG. 15, which flow chart is part of an information process executed by the delivery service management system of the present invention.

FIG. 16 shows a method of processing protection information read from a two-dimensional bar code having the format shown in FIG. 15.

The two-dimensional bar code in FIG. 15 is scanned with a two-dimensional bar code reader (e.g., 30k in FIG. 4) of seller (retail shop) 70 in FIG. 1. A central processing unit (CPU; not shown) in terminal 20k connected to this bar code reader 30k reads the contents of unity code area 101, system information area 103, user information area 104, and protection information area 105 in accordance with the scanned two-dimensional bar code (ST200).

The CPU in the terminal checks in accordance with the read content of the protection information area whether the protection flags are set at "1" (ST202). In the case shown in FIG. 15, the protection flags of user information A, user information B, and user information C are set at "0", and the protection flag of user information D is set at "1".

Since user information A, user information B, and user information C, the protection flags of which are set at "0", are not protected (NO in ST202), the read result of the two-dimensional bar code (contents of user information A, user information B, and user information C) is displayed on the display of terminal 20k and printed out as needed (ST206).

Since user information D having the protection flag of "1" is protected (YES in ST202), the read result of the two-dimensional bar code (the contents of user information D) is unknown. If an operator of terminal 20k which has read the two-dimensional bar code is qualified to access information D (e.g., if information D is of the retail shop using this terminal and this terminal has specific user ID=D), a memory (ROM) which stores a decode table for decoding scrambled information D is incorporated in this terminal 20k. In this case, the CPU in terminal 20k looks up the decode table of the ROM incorporated therein to decode scrambled user information D having the protection flag of "1" and convert the code of user information D into accessible contents (ST204).

The contents of code-converted user information D are displayed on the display of terminal 20k and printed out as needed (ST206).

Figure 17:
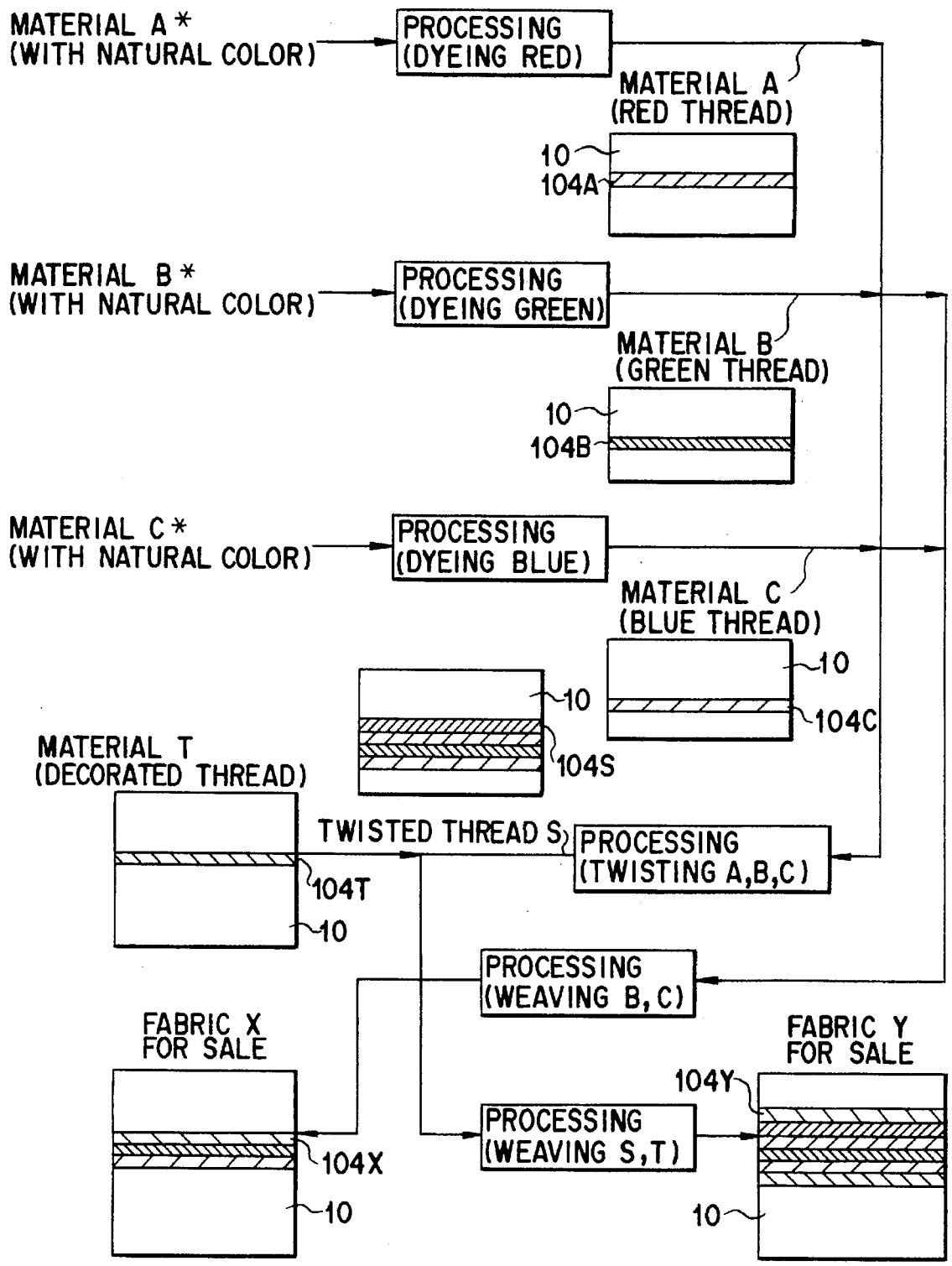
FIG. 17 is a view exemplifying changes in two-dimensional bar code through delivery services from production of a plurality of threads (raw material; upstream goods) to production of a plurality of fabrics (processed goods; downstream goods)

FIG. 17 shows changes in two-dimensional bar code through delivery services in production of a plurality of fabrics (processed goods; downstream goods) from a plurality of threads (raw material; upstream goods).

For example, when thread manufacturer A* dyes its own thread in red and ships red thread A, two-dimensional bar code 10 written with thread information 104A containing key information of thread manufacturer A* and content information of thread A is adhered to a package of this thread A. When thread manufacturer B* dyes its own thread in green and ships green thread B, two-dimensional bar code 10 written with thread information 104B containing key information of thread manufacturer B* and content information of thread B is adhered to a package of this thread B. When thread manufacturer C* dyes its own thread in blue and ships blue thread C, two-dimensional bar code 10 written with thread information 104C containing key information of thread manufacturer C* and content information of thread C is adhered to a package of this thread C.

Assume threads B and C are shipped to weaver X* and fabric X is manufactured. A two-dimensional bar code 10 written with thread information 104B and thread information 104C together with fabric information 104X containing key information of weaver X* and content information of fabric X is adhered to the package of fabric X when fabric X is to be shipped.

On the other hand, threads A to C are also shipped to thread processing worker S*. Thread processing worker S* produces twisted thread S obtained by twisting threads A to C. Two-dimensional bar code 10 written with thread information 104A, thread information 104B, and thread information 104C of the raw materials together with thread information 104S containing key information of thread processing worker S* and content information of twisted thread S is adhered to the package of twisted thread S when twisted thread S is to be shipped.

This twisted thread S and another decorated thread T are shipped to another weaver Y*. Two-dimensional bar code 10 written with thread information 104T containing key information of the thread manufacturer and content information of decorated thread T is adhered to decorated thread T.

Weaver Y* produces fabric Y using twisted thread S and decorated thread T. Two-dimensional bar code 10 written with thread information 104A, thread information 104B, thread information 104C, thread information 104S, and thread information 104T together with fabric information 104Y containing key information of weaver Y* and content information of fabric Y is adhered to the package of fabric Y when fabric Y is to be shipped.

Two-dimensional bar code 10 whose related information (key information related to the source of goods and content information of goods itself) is accumulated through the delivery services from production of the threads (A to C, S, and T) to production of the fabric (X and Y) is always attached to the delivery service goods (articles) and moved together therewith.

when two-dimensional bar code 10 attached to the goods (article) at each delivery service stage is read, the current information of the goods (article) itself and information up to the stage of the raw material used for this goods can be obtained.

The information read from this two-dimensional bar code 10 is sequentially registered in database 1001 of UVAS 100. Once the read information is registered, two-dimensional bar code 10 can have only key information for the registered information (content information can be accessed from database 1001 of UVAS 100 with reference to corresponding key information).

This key information requires a smaller number of character codes than that of the corresponding content information. Although the quantity of information accumulated in two-dimensional bar code 10 is increased through complicated delivery services, most of the pieces of information can be sorted in database 1001 of UVAS 100. The storage capacity of two-dimensional bar code 10 does not overflow during any delivery service in practice.

Figure 18:
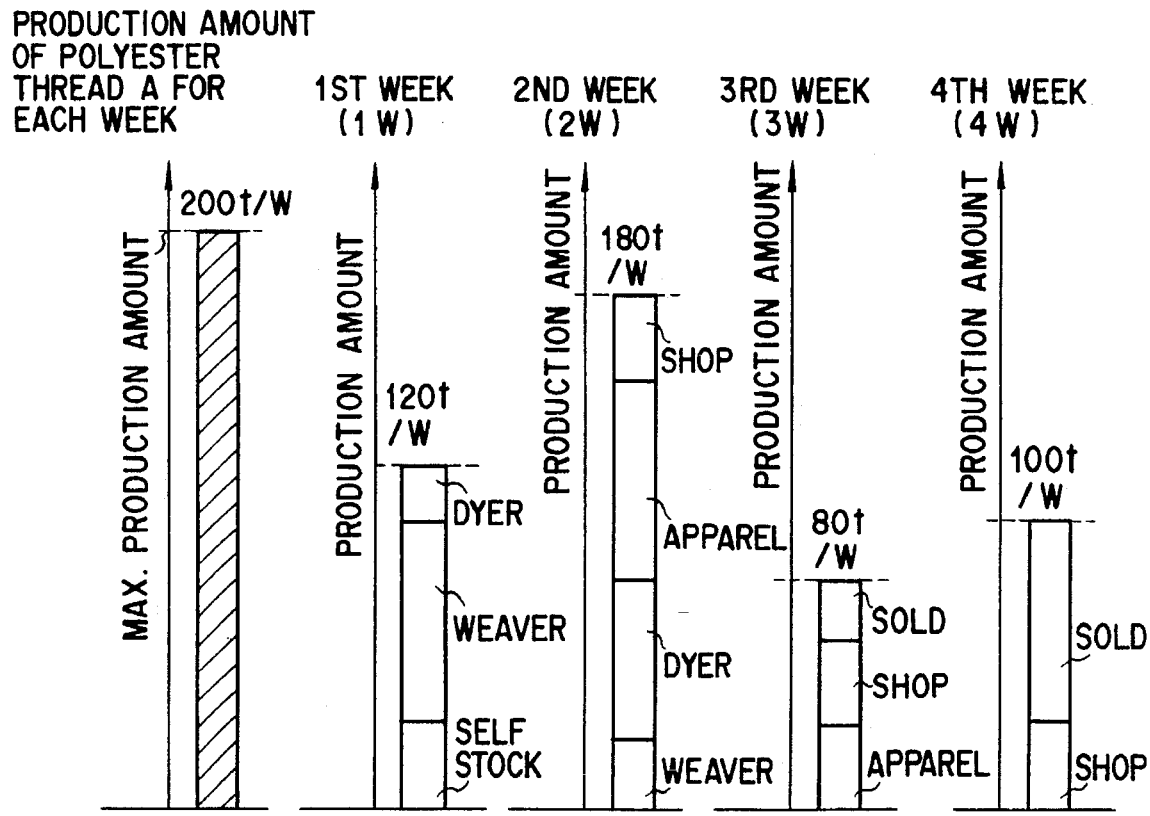
FIG. 18 is a graph showing changes in production amount of the raw material (thread) per week and delivery service destinations/amounts, which graph represents an information service which can be performed by the delivery service management system of the present invention.
Figure 19:
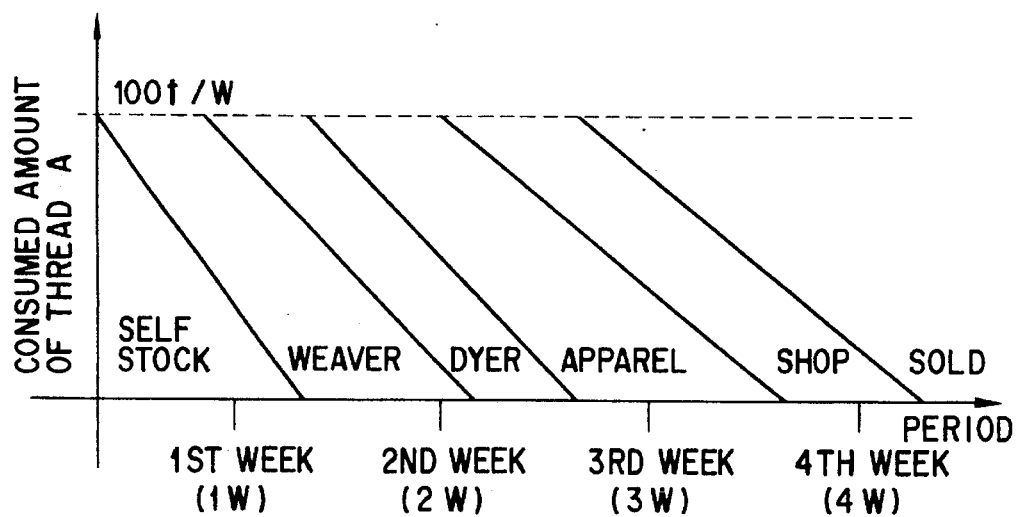
FIG. 19 is a view corresponding to data of the graph in FIG. 18, showing changes in consumption of the raw material (thread) at specific locations and specific time points.

FIG. 18 is a graph showing changes in production amount of a raw material (polyester thread A) for each week, and delivery service destinations/amounts. FIG. 19 is a view showing the process of consumption at specific times in specific places of the raw material (thread A) in correspondence with the data of the graph in FIG. 18.

Assume that thread manufacturer A* has a capacity of producing polyester thread A at a maximum of 200 tons per week, and that polyester thread A is produced in a predetermined amount per week within the production capacity (200 t/w).

Assume that thread A is produced in a total amount Of 120 tons on the first week of November, 1993, that 90 tons of thread A are shipped to at least one weaver, that 20 tons out of 90 tons of thread A are used to weave at least one kind of fabric, and that the fabric or fabrics are transferred to at least one dyer. The stock amount of thread A of thread manufacturer A* is 30 tons, and thread A (in the fabric or fabrics) left in at least one weaver is a total of 70 tons. Thread A used for the fabric or fabrics transferred to at least one dyer is a total of 20 tons.

These pieces of information are collected in data-base 1001 of UVAS 100 from the read result of two-dimensional bar codes through the delivery services of thread A or the fabric or fabrics obtained by weaving thread A. When all the pieces of information associated with thread A and registered in database 1001 are collected and classified together with transfer destinations of the thread within a specific period (first week), a bar graph for the first week in FIG. 18 is obtained.

Similarly, assume that thread A is produced on the second week of Nov. 1993, in a total amount of 180 tons including the current stock of 30 tons of the last week, that all the produced thread is shipped to at least one weaver, that at least one kind of fabric is manufactured using 160 tons out of 180 tons, and that the manufactured fabric or fabrics are transferred to at least one dyer. Of the 160-ton fabric, a total of at least one kind of 110-ton fabric dyed by at least one dyer is delivered to at least one apparel maker. Also assume that at least one kind of clothes sewed using 30 tons out of 110 tons of the fabric is delivered to at least one retail shop.

Under the above assumptions, the stock amount of thread A of thread manufacturer A* is 0 tons, fabric A (in the fabric) left in at least one weaver is a total of 20 tons. The component of thread A in the fabric left in at least one dyer is a total of 50 tons. The component of thread A in the fabric or clothes left in at least one apparel maker is a total of 80 tons. The component of thread A in the clothes delivered to at least one retail shop is a total of 30 tons.

These pieces of information are registered in database 1001 of UVAS 100 in accordance with the read result of the two-dimensional bar code through the delivery service of thread A, the fabric obtained by weaving thread A, or the clothes sewed using this fabric. When information associated with thread A which is registered in database 1001 is collected and classified together with thread destinations within a specific period (second week), a bar graph for the second week in FIG. 18 is obtained.

Bar graphs for the third and fourth weeks in FIG. 18 are obtained from the read results of the two-dimensional bar codes on the third and fourth weeks of November, 1993.

When changes in amounts of thread A with respect to the predetermined production amount (e.g., 100 tons/week) of thread A in the related business world are arranged in units of weeks, a graph shown in, e.g., FIG. 19 can be obtained.

The graphs in FIGS. 18 and 19 show a service offered to a specific thread manufacturer by UVAS 100 utilizing two-dimensional bar codes 10.

For example, from the graph in FIG. 19, thread manufacturer A* can know time changes in stock/consumption locations of thread A produced by manufacturer A* in a predetermined amount (100 tons/week) and stock/consumption locations of thread A in processed goods (i.e., fabric and clothes) using this thread A.

In the graph of FIG. 19, it is found that 100 tons of thread A produced by manufacturer A* are entirely shipped on the second week of each month and are entirely consumed as processed goods on the fourth week of this month. Thread A is found on the level of thread manufacturer A* (on the level of neither the apparel maker nor the retail shop) to seem to be used for good sellers sold in a large quantity within a short period of time. The manager of thread manufacturer A* can predict additional orders of thread A immediately after its production.

The graphs in FIGS. 18 and 19 represent protected information. More specifically, for thread manufacturer A*, content information (information representing a shipping amount, a shipping destination, and a price) of thread A in two-dimensional bar code 10 attached to the packages of various kinds of threads shipped from thread manufacturer A* is private information which should be unknown to a third party. If this information corresponds to user information A in FIG. 15, protection flag A of the information of thread A is set at "1". For this reason, even if the third party reads this two-dimensional bar code 10, the content information of thread A is unknown. The information shown in FIG. 18 or 19 will not leak to the third party.

If apparel information (without protection) of the clothes using thread A can be accessed from UVAS 100 on the basis of the collection result of two-dimensional bar code information read at each retail shop, thread manufacturer A* can also know specific amounts of thread A used in specific fabrics used for specific parts of specific clothes of specific apparel makers.

If the above information can be offered to thread manufacturer A* without any protection except for the information of "specific apparel makers", UVAS 100 classifies a large number of apparel makers into groups. In this case, UVAS 100 can offer an information service to thread manufacturer A*, representing specific amounts of thread A used in specific fabrics of specific clothes in each apparel group.

According to the process as mentioned above, it is possible to pick up the content information (of thread A and its products) relating only to a specific thread manufacturer/seller from a group of information pieces entered with delivery service to UVAS 100, wherein the entered information pieces are obtained from many two-dimensional bar code sheets attached to various products including the materials (thread A) and its manufactured goods (cloth/fabric, dresses, etc.).

When the content of the picked up information includes a plurality of information items (e.g., the manufacturer's self stock, the locations of threads used in cloth/fabric supplied to various apparel makers, the positions of threads used in sold dresses, etc), UVAS 100 can perform a particular information service for feeding the delivery information (as shown by FIG. 18 or 19), which is obtained by arranging and classifying the picked up information for each of the information items, back to the supplier (manufacturer/seller of thread A) specified by the key information of the materials (thread A).

Figure 20:
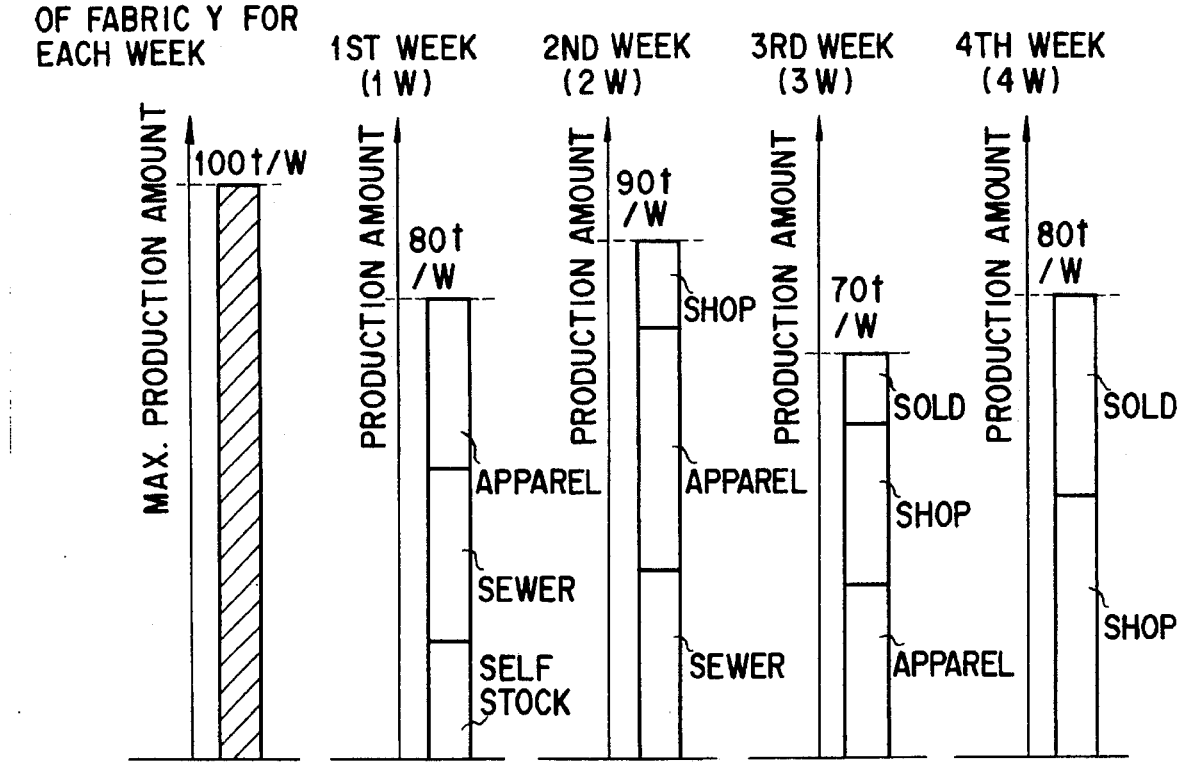
FIG. 20 is a graph showing changes in production amount of the raw material (thread) per week and delivery service destinations/amounts, which graph represents an information service which can be performed by the delivery service management system of the present invention.
Figure 21:
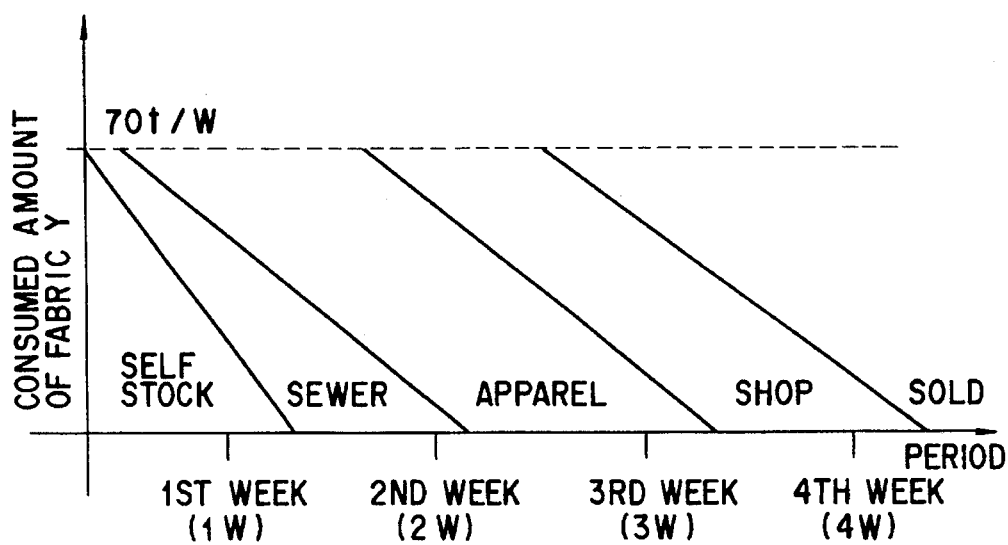
FIG. 21 is a view corresponding to data of the graph in FIG. 20, showing changes in consumption of the raw material (thread) at specific locations and specific time points.

FIG. 20 is a graph showing changes in production amount of a raw material (fabric Y) per week and delivery service destinations/amounts. FIG. 21 corresponds to the data of the graph in FIG. 20 and represents consumption of the raw material (fabric Y) at specific locations and specific time points.

Assume that fabric business company Y* has a capacity of producing fabric Y at a maximum of 100 tons/week, and that fabric Y is produced in a predetermined amount per week within the production capacity (100 t/w).

Assume that fabric Y is produced in a total amount of 80 tons on the first week of December, 1993, that 30 tons out of 80 tons of fabric Y are shipped to at least one sewer, and that 30 tons of fabric Y are also shipped to at least one apparel maker. The stock amount of fabric Y in fabric business company Y* is 20 tons, and fabric Y left in at least one sewer is a total of 30 tons. Fabric Y used for clothes sewed by at least one apparel maker is a total of 30 tons.

These pieces of information are registered in data-base 1001 of UVAS 100 from the read result of the two-dimensional bar code through the delivery service of fabric Y or the clothes obtained by sewing fabric Y. When information associated with fabric Y which is registered in database 1001 is collected and classified together with fabric destinations within a specific period (first week), a bar graph for the first week in FIG. 20 is obtained.

Similarly, assume that fabric Y is produced on the second week of December, 1993 in a total amount of 90 tons including the stock of 20 tons of the last week, that 30 tons out of 90 tons are shipped to at least one sewer, and that 60 tons of fabric Y are also shipped to at least one apparel maker. In addition, assume that one or more kinds of clothes sewed using 15 tons out of 60 tons of fabric Y shipped to at least one apparel maker are shipped to at least one retail shop.

The stock of fabric Y of fabric business company Y* is 0 tons. Fabric Y (in the clothes upon sewing) left in at least one sewer is a total of 30 tons. The component of fabric Y in the fabric or clothes left in at least one apparel maker is a total of 45 tons. The component of fabric Y in the clothes delivered to at least one retail shop is a total of 15 tons.

These pieces of information are registered in database 1001 of UVAS 100 from the read result of the two-dimensional bar code through the delivery service of fabric Y or the clothes sewed using this fabric. When the information associated with fabric Y registered in database 1001 is collected and classified together with the fabric (or clothes) destinations within a specific period (second week), a bar graph for the second week in FIG. 20 can be obtained.

Bar graphs for the third and fourth weeks in FIG. 20 can be obtained from the read results of the two-dimensional bar codes for the third and fourth weeks of December, 1993, which results are registered in database 1001 of UVAS 100.

When time changes (in units of weeks) in amounts of fabric Y with respect to the predetermined production amount (e.g., 70 tons/week) in the related business world are arranged, a graph in FIG. 21 is obtained.

The graphs in FIGS. 20 and 21 show a service offered to a specific fabric business company by UVAS 100 utilizing two-dimensional bar codes 10.

For example, from the graph in FIG. 21, fabric business company Y* can know time changes in stock/consumption locations of fabric Y produced by fabric business company Y* in a predetermined amount (70 tons/week) and stock/consumption locations of fabric Y in processed goods (i.e., clothes) using this fabric Y.

In the graph of FIG. 21, it is found that 70 tons of fabric Y produced by fabric business company Y* are entirely shipped on the second week of each month and are entirely consumed as processed goods on the fourth week of this month. Fabric Y is found on the level of fabric business company Y* (on the level of neither the apparel maker nor the retail shop) to seem to be used for good sellers sold in a large quantity within a short period of time. The salesman of fabric business company Y* can predict additional orders of fabric Y immediately after its production.

The graphs in FIGS. 20 and 21 represent protected information. More specifically, for fabric business company Y*, content information (information representing a shipping amount, a shipping destination, and a price) of fabric Y in two-dimensional bar codes 10 attached to the packages of various kinds of fabrics shipped from fabric business company Y* is private information which should be unknown to a third party. If this information corresponds to user information B in FIG. 15, protection flag B of the information of fabric Y is set at "1". For this reason, even if the third party reads this two-dimensional bar code 10, the content information of fabric Y is unknown. The information shown in FIG. 20 or 21 will not leak to the third party.

If apparel information (without protection) of the clothes using fabric Y can be accessed from UVAS 100 on the basis of the collection result of two-dimensional bar code information read at each retail shop, fabric business company Y* can also know specific amounts of fabric Y used in specific parts of specific clothes of specific apparel makers.

If the above information can be offered to fabric manufacturer Y* without any protection except for the information of "specific apparel makers", UVAS 100 classifies a large number of apparel makers into groups. In this case, UVAS 100 can offer an information service, to fabric business company Y*, representing specific amounts of fabric Y used in specific clothes in each apparel group.

Fabric business company Y* can also know the use conditions of fabric Y for each category of clothes. UVAN 100 can offer a service, to fabric business company Y*, representing, e.g., amounts of fabric Y used for linings with respect to the total amounts used in the suites sold in a plurality of retail shops on the first to fourth weeks of March, 1994.

According to the process as mentioned above, it is possible to pick up the content information (of cloth/fabric Y and its products) relating only to a specific cloth/fabric company from a group of information pieces entered with delivery service to UVAS 100, wherein the entered information pieces are obtained from many two-dimensional bar code sheets attached to various products including the materials (cloth/fabric Y) and its manufactured goods (e.g., dresses).

When the content of the picked up information includes a plurality of information items (e.g., the company's self stock, the locations of cloth/fabric supplied to various apparel makers, the positions of cloth/fabric used in sold dresses, etc), UVAS 100 can perform a particular information service for feeding the delivery information (as shown by FIG. 20 or 21), which is obtained by arranging and classifying the picked up information for each of the information items, back to the supplier (company or concern of cloth/fabric Y) specified by the key information of the materials (thread A).

Figure 22:
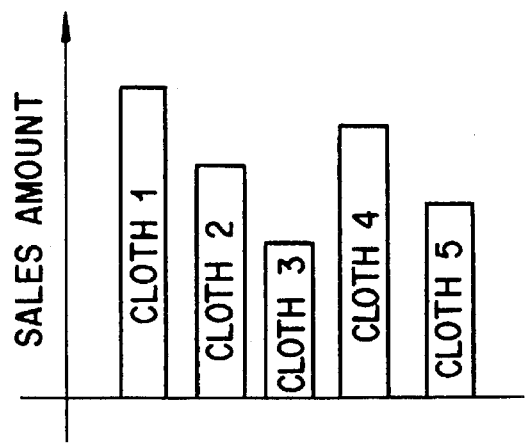
FIG. 22 is a graph showing the sales amount of goods (clothes) of a specific apparel maker, which graph represents an information service which can be performed by the delivery service management system of the present invention.

FIG. 22 shows a graph showing the sales amounts for goods on the basis of a specific apparel maker, which graph represents part of an information service which can be offered by the delivery service management system of the present invention. The information of this graph is obtained from POS information from the specific apparel maker and represents protected private information which should be unknown to a third party.

Figure 23:
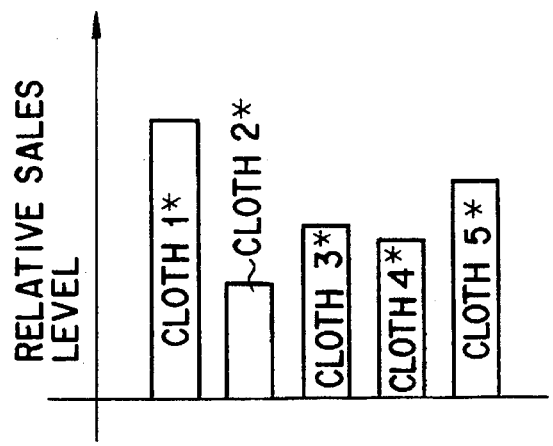
FIG. 23 is a graph showing the sales amount of goods (clothes) in the apparel business world constituted by a plurality of apparel makers, which graph represents an information service which can be performed by the delivery service management system of the present invention.

FIG. 23 shows a graph showing the relative sales amount of similar clothes in the apparel business world constituted by a plurality of indefinite apparel makers, which graph represents part of an information service which can be offered by the delivery service management system of the present invention. The management conditions of a specific apparel maker cannot be known from the information of this graph. The processed information in the apparel business world need not be protected and can be open to subscribers of UVAS 100.

Figure 24:
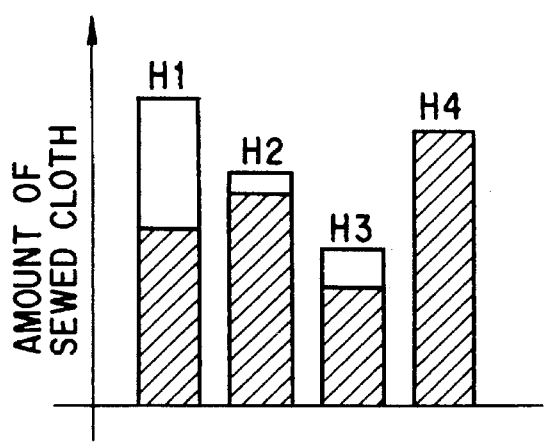
FIG. 24 is a graph showing real-time load conditions of a plurality of sewers having business transactions with a specific apparel maker, which graph represents an information service which can be performed by the delivery service management system of the present invention.

FIG. 24 shows a graph showing real-time loads of a plurality of sewers having business transactions with a specific apparel maker, which graph represents part of an information service which can be offered by the delivery service management system of the present invention. The information of this graph is not open to subscribers except for the specific apparel maker and is thus protected.

Incidentally, in the illustration of FIG. 24, the capacity of the sewer is a known information already entered in UVAS 100, while the current load of sewing can be known from accumulated information pieces gathered, via digital communication line 40, from various two-dimensional bar code sheets read at various places.

This graph representing the load conditions of the sewers provides information convenient to most efficiently finish sewing of desired clothes within a short period of time. This information is indispensable to quick response QR in production of clothes.

Figure 25:
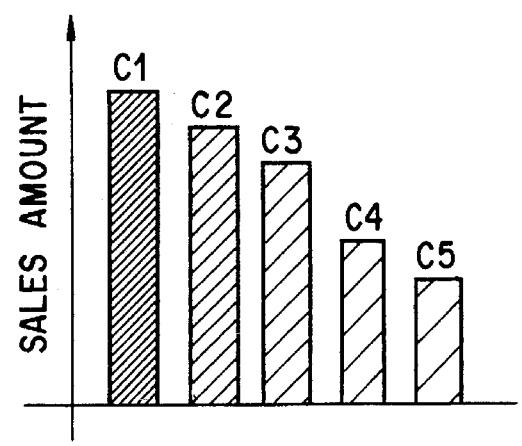
FIG. 25 is a graph showing the sales amounts of items of clothes in the apparel business world constituted by a plurality of apparel makers, which graph represents an information service which can be performed by the delivery service management system of the present invention.

FIG. 25 shows a graph representing the sales amount for each item (activation in sales for each color) of clothes in the apparel business world constituted by a plurality of apparel makers, which graph represents part of an information service which can be offered by the delivery service management system of the present invention. The processed information need not be protected and is open to all the subscribers of UVAS 100 because the information in this graph is obtained in the apparel business world.

If cloth C1 is found to be a currently good seller from the graph in FIG. 25 in the apparel business world, a given apparel maker can access UVAS 100 to know a ratio of blue clothes of its own to all blue clothes as best sellers.

When the graph in FIG. 22 is compared with that in FIG. 23, the given apparel maker can compare the sales amount of its cloth 3 with that of similar cloth 3* in the apparel business world. From the result of comparison between the graphs of FIGS. 22 and 23, if a sales manager of the apparel maker judges that the sales of dress 3 of him (or her) is not better than similar dress 3* in the current business world, he (or she) can think out a new plan for improving the sales of dress 3, well before the gross sales of dress 3 might be significantly dropped.

FIG. 26 shows a graph showing the sales amounts of clothes (downstream goods) using specific fabrics (upstream goods) in the apparel business world, which graph represents part of an information service which can be offered by the delivery service management system of the present invention. This graph represents a service to a specific fabric business company and provides protected information.

A business company dealing with fabric Y can know that 20 rolls of fabric Y are used for the right-side fabric of cloth 1* of an arbitrary apparel maker (the apparel maker cannot be specified at this moment) from the graph in FIG. 26 and the shipment data of fabric Y.

FIG. 27 shows a graph showing real-time load conditions of a plurality of thread manufacturers/weavers having business transactions with a specific fabric business company, which graph represents part of an information service which can be offered by the delivery service management system of the present invention. This graph represents a service to the specific fabric business company and provides protected information.

Incidentally, in the illustration of FIG. 27, the capacity of the thread manufacturer/weaver is a known information already entered in UVAS 100, while the current load of thread manufacturing/weaving can be known from accumulated information pieces gathered, via digital communication line 40, from various two-dimensional bar code sheets read at various places.

The graph representing the load conditions of the thread manufacturers/weavers provides information convenient to most efficiently finish desired fabrics within a short period of time. This information is indispensable to quick response QR in production of fabrics.

FIG. 28 shows a graph representing the sales amounts of goods (fabric) of a specific fabric business company, which graph represents part of an information service which can be offered by the delivery service management system of the present invention. The information in this graph is protected.

FIG. 29 shows a graph (processed information) representing the sales amount of each goods (fabric) in the business world of a plurality of fabric business companies, which graph represents part of an information service which can be offered by the delivery service management system of the present invention. The information in this graph is not protected and is open to all the subscribers of UVAS 100.

In comparison between the graphs in FIGS. 28 and 29, the business company dealing with fabric Y can compare the sales amount of its own fabric Y (X to Z) with similar fabric Y* (X* to Z*) in the business world. From the result of comparison between the graphs of FIGS. 28 and 29, if a sales manager of the fabric company/concern judges that the sales of cloth/fabric Z of him (or her) is not better than similar cloth/fabric Z* in the current business world, he (or she) can think out a new plan for improving the sales of cloth/fabric Z, well before the gross sales of cloth/fabric Z might be significantly dropped.

FIG. 30 shows a graph exemplifying changes in sales amount of cloth 1* in FIG. 26 in the apparel business world, which graph represents part of an information service which can be offered by the delivery service management system of the present invention. This graph is presented in a service offered to a specific fabric business company on future good sellers and provides protected information.

FIG. 31 shows a graph exemplifying changes in sales amount of cloth 2* in FIG. 26 in the apparel business world, which graph represents part of an information service which can be offered by the delivery service management system of the present invention. This graph is provided to a service offered to the specific fabric business company on long sellers which are not fashionable clothes. The information in this graph is protected information.

FIG. 32 shows a graph exemplifying changes in sales amount of cloth 3* in FIG. 26 in the apparel business world, which graph represents part of an information service which can be offered by the delivery service management system of the present invention. This graph is provided to a service offered to a specific fabric business company on good sellers whose sales amounts tend to be declined. The information in this graph is protected information.

FIG. 33 shows a graph exemplifying changes in sales amounts of clothes 4* and 5* in FIG. 26 in the apparel business world, which graph represents part of an information service which can be offered by the delivery service management system of the present invention. This graph is provided to a service offered to a specific business company on clothes belonging the range between the good and bad sellers and future bad sellers whose sales amount tends to be declined. The information in this graph is protected information.

Incidentally, if private information items for specific subscribers of UVAS 100, as shown by FIGS. 30–33, are modified to non-private information items with respect to whole business world, these non-private information items are opened to the subscribers of UVAS 100 without protection.

According to a delivery service management system of the present invention, desired delivery service data can be fed back to each relating system subscriber from a set of pieces of information involving in delivery services of various kinds of goods in large quantities between various system subscribers. In addition, information (two-dimensional bar code information) representing sources and contents up to individual parts constituting goods subjected to delivery services can be sent together with the delivered goods. Data exchange can be received by the UVAS in real time. Therefore, information (e.g., as for a thread manufacturer, information representing use of its own thread for a specific dress) which cannot be conventionally known to each individual business fellow can be accessed timely.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A system for managing delivery among suppliers of materials, manufacturers of products using the materials, sellers of goods corresponding to or being same as the products, and customers of the goods, said system comprising:

first information holding media each attached to the material supplied from any of the suppliers to any of the manufacturers, each said first information holding medium holding key information for specifying a specific supplier of the material to which the first information holding medium has been attached, and optionally holding content information for describing a content of this material;

second information holding media each attached to the product supplied from any of the manufacturers to any of the sellers, each said second information holding medium holding key information for specifying a specific manufacturer of the product to which the second information holding medium has been attached, and optionally holding content information for describing a content of this product;

third information holding media each attached to the goods delivered from any of the sellers to any of customers, each said third information holding medium holding key information for specifying a specific seller of the goods to which the third information holding medium has been attached, and optionally holding content information for describing a content of this goods;

means for gathering the key information and the content information, if exists, from any of the first, second, and third information holding media, each time when the delivery of the material having the first information holding medium has occurred between any of the suppliers and any of the manufacturers, each time when the delivery of the product having the second information holding medium has occurred between any of the manufacturers and any of the sellers, and each time when the delivery of the goods having the third information holding medium has occurred between any of the sellers and any of the customers, so as to provide an integrated group of the gathered information with respect to the key and content information; and means for preparing total or statistics data, relating to any of the materials, products, and goods, from the gathered information in the integrated group provided by said gathering means.

2. A delivery service management system for managing delivery or distribution of various things, said delivery service management system comprising:

a first information holding medium which is attached to a thing before the thing is delivered from a first place to a second place, first information holding medium holding key information indicating a source of the thing and content information describing a content of the thing, the content of the thing indicating at least parts which comprise the thing;

means for gathering the key information and the content information of the thing from first information holding medium attached to the thing when the thing is delivered from the first place to the second place;

means for obtaining specific information with respect to the thing from the content information gathered by gathering means, for accumulating specific content information on the content of the thing being delivered from the first place to the second place, and for accumulating content information of other previously delivered things;

means for feeding the specific and accumulated information, obtained by said obtaining means, back to the source of the thing relating to the specific information;

a second information holding medium which is attached to a product of the thing before the product is delivered from the second place to a third place, second information holding medium holding second key information indicating a second source of the product and second content information describing a content of the product;

supplying means, serving as said source of the thing and located at said first place, for supplying the thing;

processing means, serving as said second source of the product and located at said second place, for processing the thing supplied by said supplying means to produce the product of said thing;

second gathering means for gathering the second key information and the second content information of the product from second information holding medium attached to the product when the product is delivered from the second place to the third place; and means for obtaining total or statistics data with respect to the product from the key information held by first and second information holding medium.

3. The system of claim 2, further comprising:

first writing means for writing, at supplying means, the key information and the content information of the thing to the information holding medium to be attached to the thing; and second writing means for writing, at said processing means, the key information and the content information of the thing as well as the key information and the content information of the product to the second information holding medium to be attached to the product.

4. The system of claim 1, wherein said information holding medium includes a two-dimensional bar code.

5. The system of claim 3, wherein said information holding medium includes a two-dimensional bar code.

6. The system of claim 5, wherein said two-dimensional bar code includes:

a user area for storing the key information and the content information; and a protect area for protecting specific information stored in the user area from being known by an unauthorized party.

7. The system of claim 2, wherein:

the key information held by said first information holding medium includes a code of raw material of the product or a manufacturer code of the raw material, and the content information held by said first information holding medium includes information with respect to a manner of producing the raw material or a construction of the raw material; and the key information held by said second information holding medium includes a code of the product or a manufacturer code of the product, and the content information held by said second information holding medium includes information with respect to a manner of producing the product or a construction of the product.

8. The system of claim 7, wherein the product includes fabric, cloth or a dress, and the raw material includes threads.

9. A method of managing a delivery service wherein a first information holding medium is attached to a thing which is delivered from a first place to a second place, and holds key information indicating a source of the thing and content information describing a content of the thing the content of the thing indicating at least parts which comprise the thing, said method comprising the steps of:

gathering key information and content information of the thing from said first information holding medium when the thing is delivered from the first place to the second place;

obtaining specific information with respect to the thing from the gathered content information and accumulating specific content information on the content of the thing being delivered from the first place to the second place, and for accumulating content information of other previously delivered things;

feeding the obtained specific and accumulated information back to the source of the thing based on the key information;

wherein a second information holding medium is attached to a product of the thing delivered from the second place to a third place, and holds key information indicating a second source of the product and content information describing a content of the product, gathering the key information and the content information of the product from said second information holding medium when the product is delivered from the second place to the third place; arranging the gathered content information based on a prescribed item to provide divided information pieces relating to each other;

feeding the divided information pieces back to a member authorized to access the divided information pieces; and obtaining total or statistics data with respect to the product from the key information held by said first and second information holding medium.

10. The method according to claim 9, wherein said information holding medium holds a two-dimensional bar code thereon, from which key information and content information are gathered in said gathering step.

11. A delivery service management system for managing delivery or distribution of various things, delivery service management system comprising:

a first information holding medium which is attached to a thing before the thing is delivered from a first place to a second place, first information holding medium holding key information indicating a source of the thing and content information describing a content of the thing, the content of the thing indicating at least parts which comprise the thing;

information management means for gathering key information and content information of the thing from first information holding medium when the thing is delivered from the first place to the second place; for obtaining specific information with respect to the thing from the gathered content information for accumulating specific content information on the content of the thing being delivered from the first place to the second place, and for accumulating content information of other previously delivered things; and for enabling feeding of the obtained specific and accumulated information back to the source of the thing based on the key information;

a second information holding medium which is attached to a product of the thing before the product is delivered from the second place to a third place, second information holding medium holding second key information indicating a second source of the product and second content information describing a content of the product; and means for obtaining total or statistics data with respect to the product from the key information held by said first and second information holding medium.

12. The system of claim 11, wherein said information holding medium includes:

means for holding the key information and the content information; and means for protecting information held by the holding means from being known by an unauthorized party.

13. The system of claim 12, wherein said information holding means includes a two-dimensional bar code.

14. The system of claim 11, wherein said second information medium includes a two-dimensional bar code.

15. The system of claim 11, wherein said second information holding medium includes:

means for holding the second key information and the second content information; and means for protecting specific information held by the holding means from being known by an unauthorized party.

16. The system of claim 11, wherein said information management means further includes:

means for reading from said information holding medium the key information and the content information of thing; and means for writing to second information holding medium at least the key information of thing as well as the second key information and the second content information of said product, so that information of the thing and the product is accumulated in second information holding medium.

17. The system of claim 11, wherein information management means further includes:

first gathering means for gathering the key information and the content information of the thing from information holding medium attached to the thing when the thing is delivered from the first place to the second place;

second gathering means for gathering the key information and the content information of the product from second information holding medium attached to the product when the product is delivered from the second place to the third place;

means for arranging the content information gathered by said first and second gathering means based on a prescribed item to provide divided information pieces relating to each other; and means for feeding the divided information pieces, provided by said arranging means, back to a member of the delivery service management system authorized to access the divided information pieces.

18. The system of claim 11, wherein said information management means further includes:

means for gathering the key information and the content information of the thing from information holding medium attached to the thing when the thing is delivered from the first place to the second place;

means for obtaining specific information with respect to the thing from the content information gathered by gathering means; and means for feeding the specific information, obtained by obtaining means, back to the source of the thing relating to the specific information.

19. The system of claim 11, wherein said information holding medium comprises a two-dimensional bar code including:

an area for holding a unity code which is specific to the delivery service management system; and a user area for holding the key information and the content information of each thing to be delivered.

20. A delivery service management system for managing delivery or distribution of various things, said delivery service management system comprising:

a first information holding medium which is attached to a thing before the thing is delivered from a first place to a second place, said first information holding medium holding key information indicating a source of the thing and content information describing a content of the thing;

means for gathering the key information and the content information of the thing from first information holding medium attached to the thing when the thing is delivered from the first place to the second place;

means for obtaining specific information with respect to the thing from the content information gathered by said gathering means, for accumulating specific content information on the content of the thing being delivered from the first place to the second place, and for accumulating content information of other previously delivered things;

means for feeding the specific and accumulated information, obtained by said obtaining means, back to the source of the thing relating to the specific information;

a second information holding medium which is attached to a product of the thing before the product is delivered from the second place to a third place, said second information holding medium holding second key information indicating a second source of the product and second content information describing a content of the product;

supplying means, serving as said source of the thing and located at first place, for supplying the thing;

processing means, serving as second source of the product and located at second place, for processing the thing supplied by supplying means to produce the product of said thing;

second gathering means for gathering the second key information and the second content information of the product from said second information holding medium attached to the product when the product is delivered from the second place to the third place; and means for obtaining total or statistics data with respect to the product from the key information held by first and second information holding medium.

21. The system of claim 20, wherein said first information holding medium includes a two-dimensional bar code.

* * * * *

UNITED STATES PATENT AND TRADEMARK OFFICE
CERTIFICATE OF CORRECTION

PATENT NO. : 5,541,394
DATED : July 30, 1996
INVENTOR(S) : Kouchi et al.

It is certified that error appears in the above-indentified patent and that said Letters Patent is hereby corrected as shown below:

Title page, Item [56] References Cited, FOREIGN PATENT DOCUMENTS insert --FR 2 645 992  10/1990  France--.

Title page, insert --OTHER PUBLICATIONS

OFFICE EQUIPMENT & PRODUCTS, Vol. 20, No. 156, Sept. 1991, Japan, pp. 44-45, "In Full Swing, JICFS Operations Enhance Market Efficiency".

OFFICE EQUIPMENT & PRODUCTS, Vol. 20, No. 156, Sept. 1991, Japan, p. 47, "Apparel Business Sews Up New Information System".

IBM TECHNICAL DISCLOSURE BULLETIN, Vol. 33, No. 6A, Nov. 1990, New York, U.S., pp. 71-72, "Chaining of Tracking Labels in Distribution Centers".

COMPUTERS, Vol. 25, No. 6, June 1992, USA, pp. 18-28, XP000303772, T. PAVLIDIS et al, "Information Encoding With Two-dimensional Bar Codes".--

Signed and Sealed this

Eighteenth Day of February, 1997

Attest:

BRUCE LEHMAN

Attesting Officer

Commissioner of Patents and Trademarks